US007812840B2

(12) United States Patent
Uranaka et al.

(10) Patent No.: US 7,812,840 B2
(45) Date of Patent: Oct. 12, 2010

(54) SCENE MODIFIER REPRESENTATION GENERATION APPARATUS AND SCENE MODIFIER REPRESENTATION GENERATION METHOD

(75) Inventors: Sachiko Uranaka, Tokyo (JP); Makoto Yasugi, Kanagawa (JP); Toshiyuki Tanaka, Tokyo (JP); Seiya Miyazaki, Tokyo (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 11/720,376

(22) PCT Filed: Nov. 28, 2005

(86) PCT No.: PCT/JP2005/021804

§ 371 (c)(1),
(2), (4) Date: May 29, 2007

(87) PCT Pub. No.: WO2006/059570

PCT Pub. Date: Jun. 8, 2006

(65) Prior Publication Data

US 2008/0165194 A1 Jul. 10, 2008

(30) Foreign Application Priority Data

Nov. 30, 2004 (JP) ............................ 2004-347840

(51) Int. Cl.
*G06T 13/00* (2006.01)

(52) U.S. Cl. ....................... 345/473; 345/419; 345/420; 345/474; 345/619; 345/620; 345/634; 382/232; 704/9; 704/10; 707/3

(58) Field of Classification Search ................. 345/419, 345/420, 422, 156, 473, 619, 620, 634, 474, 345/629; 382/232; 463/5; 704/10, 9; 707/3
See application file for complete search history.

(56) References Cited

U.S. PATENT DOCUMENTS 6,331,861 B1 * 12/2001 Gever et al. ................. 345/629
6,593,936 B1 * 7/2003 Huang et al. ................ 345/619
6,839,672 B1 * 1/2005 Beutnagel et al. ........... 704/260
7,349,840 B2 * 3/2008 Budzinski ...................... 704/9

(Continued)

FOREIGN PATENT DOCUMENTS

JP 7-334507 12/1995

(Continued)

OTHER PUBLICATIONS

English language Abstract of JP 8-263681.

(Continued)

*Primary Examiner*—Kimbinh T Nguyen
(74) *Attorney, Agent, or Firm*—Greenblum & Bernstein, P.L.C.

(57) ABSTRACT

There are provided a scene modifier generation device and a scene modifier generation method capable of improving expressive power of animation when automatically generating a modifier concerning a scene used in computer graphics from an inputted text sentence. A scene modifier as a modification expression concerning a scene of computer graphics is stored together with the application condition. It is possible to automatically generate a unique scene modifier appropriate for a scene according to an agentive in the scenario, a meaning of the operation, and a component of a scene modifier contained in the scenario including an adverb.

19 Claims, 14 Drawing Sheets

U.S. PATENT DOCUMENTS

| | | | | |
|---|---|---|---|---|
| 7,548,243 | B2 * | 6/2009 | Peachey | 345/473 |
| 2007/0038610 | A1 * | 2/2007 | Omoigui | 707/3 |
| 2009/0295806 | A1 * | 12/2009 | Peachey | 345/473 |

FOREIGN PATENT DOCUMENTS

| | | |
|---|---|---|
| JP | 8-263681 | 10/1996 |
| JP | 11-328439 | 11/1999 |
| JP | 2000-338952 | 12/2000 |

OTHER PUBLICATIONS

English language Abstract of JP 11-328439.
English language Abstract of JP 2000-338952.
English language Abstract of JP 7-334507.

* cited by examiner

105

201 202 203

| No. | Word | Characteristic Parameter |
|---|---|---|
| 1 | "hurriedly" | $(hurry) |
| 2 | "extremely"+$$(characteristic parameter) | Add(+, $$ characteristic parameter) |
| 3 | "all out"@$$(locomotive action) | $(hurry++) |
| 4 | "all out"@$$(emotive action) | $(exaggeration++) |
| 5 | "wail" | $(exaggeration+) |
| 6 | "extremely"@$$(action verb) | $(exaggeration) |
| 7 | "boohoo"@$(cry) | $(exaggeration), $$(onomatopoeia) |
| 8 | "give a scream" | $(fear++) |
| 9 | "have a brainwave" | $(brainwave) |
| 10 | $$(description font larger than other parts) | Add(+, $$ characteristic parameter) |
| 11 | "be staggered" | $(stun) |
| 12 | "stunned" | $(stun) |

FIG.2

| No. | Scenario (301) | Agent (302) | Action (303) | Characteristic Parameter (203) |
|---|---|---|---|---|
| 1 | Hanako ran hurriedly. | $(Hanako) | $(run) | $(hurry) |
| 2 | Hanako ran extremely hurriedly. | $(Hanako) | $(run) | $(hurry+) |
| 3 | Hanako ran all out. | $(Hanako) | $(run) | $(hurry++) |
| 4 | Hanako cried all out. | $(Hanako) | $(cry) | $(exaggeration++) |
| 5 | Hanako wailed. | $(Hanako) | $(cry) | $(exaggeration+) |
| 6 | Hanako cried extremely. | $(Hanako) | $(cry) | $(exaggeration) |
| 7 | Hanako cried "boohoo". | $(Hanako) | $(cry) | $(exaggeration), $$(onomatopoeia) |
| 8 | Hanako gave a scream. | $(Hanako) | $(scream) | $(fear++) |
| 9 | Hanako had a brainwave. | $(Hanako) | $(clap hands) | $(brainwave+) |
| 10 | Hanako was staggered. | $(Hanako) | $(stand) | $(stun) |
| 11 | Hanako was stunned. | $(Hanako) | $(stand) | $(stun) |
| 12 | Hanako was stunned. | $(Hanako) | $(eat a meal) | $(stun) |

<table>
<tr><th>Dictionary ID</th><th>Match Conditions</th><th>Scene Modifier Representation</th></tr>
<tr><td>001</td><td>agent@$$(human being)<br>action@$(run)<br>characteristic parameter = $(hurry)|$(hurry+)|$(hurry++)</td><td>Draw running lines ($(line type)) in overall scene<br>Draw lines ($(quantity), $(line type)) behind agent space<br>Agent' s face has gritted teeth</td></tr>
<tr><td>002</td><td>agent@$$(human being)<br>action@$(cry)<br>characteristic parameter = $(exaggeration)|$( exaggeration +)|$( exaggeration ++)</td><td>Make tears ($(quantity)) run down agent' s face</td></tr>
<tr><td>003</td><td>agent@$$(human being)<br>action@$$(action)<br>characteristic parameter = $$(onomatopoeia)</td><td>Display $$(onomatopoeia) ($(size)) above agent space</td></tr>
<tr><td>004</td><td>agent@$$(human being)<br>action@$$(action)<br>characteristic parameter = $$(fear)|$$(fear+)|$$(fear++)</td><td>Make agent' s hair stand on end<br>Display text ($(font), $(size)) ' That' s scary!' above agent space</td></tr>
<tr><td>005</td><td>agent@$$(human being)<br>action@$(clap hands)<br>characteristic parameter = $(brainwave)</td><td>Emit agent' s $(clap hands) sound ($(size)) and draw lines ($(quantity)) for emission of loud sound</td></tr>
<tr><td>006</td><td>agent@$$(human being)<br>action@$$(action)<br>characteristic parameter = $(brainwave)</td><td>Display character ($(font), $(size)) ' !' above agent space</td></tr>
<tr><td>007</td><td>agent@$$(human being)<br>action@$(eat)<br>characteristic parameter = $(stun)</td><td>Agent drops $(eating utensil) or $(food) held in his/her hand</td></tr>
<tr><td>008</td><td>agent@$$(human being)<br>action@$$(action)<br>characteristic parameter = $(stun)</td><td>Movement of agent stops ($(length)), draw lines on face ($(quantity))<br>Movement of active subject other than agent stops ($(length)), draw lines on face ($(quantity))</td></tr>
</table>

[Scene 1]
Agent(s): $(Taro), $(Hanako)
Location: $(park)
Object(s): $(slide), $(horizontal bars)
Time: $(night)

(B)

500b

[Scene 2]
Agent(s): $(Hanako)
Location: $(park)
Object(s): $(slide), $(horizontal bars)
Time: $(day)

(C)

500c

[Scene 3]
Agent(s): $(Hanako),$(Taro)
Location: $(restaurant)
Object(s): $(forks)
Time: $(night)

| Knowledge ID | Knowledge Application Condition | Scene Modifier Representation Optimization Content |
|---|---|---|
| 001 | $(scene) component subject is one person | Give preference to representation for overall scene<br>Give preference to representation for agent or agent space |
| 002 | $(scene) component subject is plural | Give preference to representation relating to active subject other than agent if available<br>Give preference to representation for agent or agent space |
| 003 | Text application condition present in $(scene modifier representation) | ◎ Give preference to text application |
| 004 | $(scene) time is $(day) | Make $(line type) a dark color |
| 005 | $(scene) time is $(night) | Make $(line type) white |
| 006 | $(characteristic parameter) has + | Make 30% increase in values of $(quantity), $(size), and $(length) of item represented |
| 007 | $(characteristic parameter) has ++ | Make 60% increase in values of $(quantity), $(size), and $(length) of item represented<br>◎ Make multiple selections when there are multiple scene modifier representations for which application is possible |

FIG.6

| 301 Scenario | 302 Agent | 303 Action | 203 Characteristic Parameter | 500 Scene Information | 403 Scene Modifier Representation |
|---|---|---|---|---|---|
| Hanako ran hurriedly. | $(Hanako) | $(run) | $(hurry) | [Scene 2] | Draw running lines (black) in $(Hanako)' s agent space |
| Hanako ran extremely hurriedly. | $(Hanako) | $(run) | $(hurry+) | [Scene 1] | Draw lines (white) increased by 30% behind $(Hanako)' s agent space |
| Hanako ran all out. | $(Hanako) | $(run) | $(hurry++) | [Scene 1] | Draw lines (white) increased by 60% behind $(Hanako)' s agent space, $(Hanako) grits her teeth |
| Hanako cried all out. | $(Hanako) | $(cry) | $(exaggeration++) | [Scene 1] | Emit $(Hanako)' s tears increased by 60% |
| Hanako wailed. | $(Hanako) | $(cry) | $(exaggeration+) | [Scene 2] | Emit $(Hanako)' s tears increased by 30% |
| Hanako cried extremely. | $(Hanako) | $(cry) | $(exaggeration) | [Scene 2] | Emit $(Hanako)' s tears |
| Hanako cried "boohoo". | $(Hanako) | $(cry) | $(exaggeration) | [Scene 1] | Display text 'Boohoo' above $(Hanako)' s agent space |
| Hanako gave a scream. | $(Hanako) | $(scream) | $(fear++) | [Scene 1] | Make $(Hanako)' s hair stand on end<br>Display text 'That' s scary!' increased in size by 60% above $(Hanako)' s agent space |
| Hanako had a brainwave. | $(Hanako) | $(clap hands) | $(brainwave+) | [Scene 3] | Display character '!' increased in size by 30% above $(Hanako)' s agent space |
| Hanako was staggered. | $(Hanako) | $(stand) | $(stun) | [Scene 2] | Movement of $(Hanako) stops, draw lines on face |
| Hanako was stunned. | $(Hanako) | $(stand) | $(stun) | [Scene 3] | Movement of $(Hanako) and $(Taro) stops, draw lines on face |
| Hanako was stunned. | $(Hanako) | $(eat a meal) | $(stun) | [Scene 3] | $(Hanako) drops $(fork) |

| Agent | Property |
|---|---|
| $(Hanako) | $(calm) |
| $(Taro) | $(crybaby) |
| $(Ichiro) | $(jovial) |
| $(Jiro) | $(speedy) |

<table>
<tr><th>Dictionary ID</th><th>Match Conditions</th><th>Scene Modifier Representation</th></tr>
<tr><td>001</td><td>agent@$$(human being) & agent has_a_property $(calm)<br>action@$(cry)<br>characteristic parameter=$(exaggeration)|$(exaggeration+)|$(exaggeration++)</td><td>Make tears (20% reduction in $(quantity))<br>run down agent' s face</td></tr>
<tr><td>002</td><td>agent@$$(human being) & agent has_a_property $(crybaby)<br>action@$(cry)<br>characteristic parameter = $(exaggeration)|$(exaggeration+)|$(exaggeration++)</td><td>Make tears (20% increase in $(quantity))<br>run down agent' s face</td></tr>
<tr><td>003</td><td>agent@$$(human being) & agent has_a_property $(jovial)<br>action@$(laugh)<br>characteristic parameter = $(cheerful)</td><td>Display text 'Hahaha' ($(font), $(size))<br>above agent space</td></tr>
<tr><td>004</td><td>agent@$$(human being) & agent has_a_property $(speedy)<br>action@$(run)<br>characteristic parameter = $(smoke)</td><td>Smoke rises from soles of agent' s feet</td></tr>
</table>

FIG.13

| 301 Scenario | 302 Agent | 304 Agent' s Property | 303 Action | 203 Characteristic Parameter | 500 Scene Information | 1303 Scene Modifier Representation |
|---|---|---|---|---|---|---|
| Taro cried all out | $(Taro) | $(crybaby) | $(cry) | $(exaggeration++) | [Scene 1] | Emit $(Taro)' s tears increased by 92% |
| Hanako ran extremely hurriedly | $(Hanako) | $(speedy) | $(run) | $(hurry+)<br>$(smoke) | [Scene 1] | Draw lines (white) increased by 30% behind $(Hanako)' s agent space<br>Smoke rises from soles of $(Hanako)' s feet |

FIG.14

SCENE MODIFIER REPRESENTATION GENERATION APPARATUS AND SCENE MODIFIER REPRESENTATION GENERATION METHOD

TECHNICAL FIELD

The present invention relates to a scene modifier representation generation apparatus and scene modifier representation generation method that generate a modifier representation to be assigned to computer graphics when creating computer graphics from text.

BACKGROUND ART

Conventionally, when creating computer graphics from text, there is a method whereby a modifier representation is generated, and computer graphics are created using this modifier representation (see Patent Document 1, for example).

With this method, when converting text content to computer graphics animation (hereinafter referred to simply as "animation"), a verb and adverb are first extracted from the text. Next, a verb/action pattern dictionary is searched using the extracted verb and a human-body action pattern is generated, and a qualifier/action-degree dictionary is searched using the extracted adverb and a human-body action pattern action-degree is acquired. Then animation is generated by applying the acquired action-degree to the human-body action pattern.

With this method, a technique is also used whereby a human-body action pattern is generated while achieving synchronization of action and speech from the length of the text.

According to this method, input natural-language text can be output as synthetic speech, and a human-body action pattern synchronized with speech can be generated automatically, making it effective when generating animation that requires realistic representation, such as an avatar.

Patent Document 1: Unexamined Japanese Patent Publication No. HEI 7-334507

DISCLOSURE OF INVENTION

Problems to be Solved by the Invention

However, with the above-described method, a human-body action pattern is generated by applying an action-degree associated with an adverb to a human-body action pattern associated with a verb in the text. Therefore, ultimately obtained human-body action patterns, while differing somewhat in degree, are limited to specific human-body action patterns. Consequently, even if a user tries to improve the expressiveness of animation, it is only possible to vary the action-degree of established human-body action patterns.

One possible technique for improving the expressiveness of animation is to increase the types of human-body action patterns associated with one verb, select a human-body action pattern from a combination of verb and adverb, and apply an action-degree to the selected human-body action pattern.

However, with such a technique, it is not possible to automatically generate variations affecting the overall scene, especially when using entertainment-oriented content, such as pasting a screen tone to indicate a sense of speed behind a hero running all out, or onto the overall background, drawing vertical lines on the hero's face or on the background to indicate effectively the magnitude of a shock suffered by the hero, or shining a spotlight on the hero to emphasis his or her isolation.

Thus, a problem with a conventional method is that improvement of the expressiveness of animation can only be implemented within the scope of realistic representation in which the types of human-body action patterns and the action-degree are varied.

It is an object of the present invention to provide a scene modifier representation generation apparatus and scene modifier representation generation method that enable the expressiveness of animation to be significantly improved when a modifier representation relating to a scene used in computer graphics is generated automatically from input text.

Means for Solving the Problems

A scene modifier representation generation apparatus of the present invention employs a configuration that includes: a scene modifier representation dictionary that stores a scene modifier representation that is a modifier representation relating to a computer graphics scene together with an application condition; a scene modifier representation selection section that selects a scene modifier representation corresponding to an application condition that matches agent and action information and a characteristic parameter indicating a characteristic of an provided scenario that are obtained from the scenario using the scene modifier representation dictionary; and a data output section that outputs a selected scene modifier representation.

ADVANTAGEOUS EFFECT OF THE INVENTION

According to the present invention, a scene modifier representation suitable for a scene can be generated automatically from a scene modifier component included in a provided scenario (for example, input text). That is to say, the expressiveness of animation can be significantly improved when a modifier representation relating to a scene used in computer graphics is generated automatically from input text.

BRIEF DESCRIPTION OF DRAWINGS

FIG. 2 is a drawing showing an example of a word characteristic dictionary according to this embodiment;

FIG. 3 is a drawing showing an example of text scenarios and combinations of agents, actions, and characteristic parameters obtained therefore according to this embodiment;

FIG. 4 is a drawing showing an example of a scene modifier representation dictionary according to this embodiment;

FIG. 5 (A) is a drawing showing an example of scene information, FIG. 5 (B) is a drawing showing another example of scene information, and FIG. 5 (C) is a drawing showing yet another example of scene information.

FIG. 6 is a drawing showing an example of scene modifier representation optimization knowledge according to this embodiment;

FIG. 9 is a drawing showing an example of scene modifier representations finally obtained when scene information is applied to the scenarios shown in FIG. 3 according to this embodiment;

FIG. 12 is a drawing showing an example of agents and their properties stored in the agent property database shown in FIG. 11;

FIG. 13 is a drawing showing an example of a scene modifier representation dictionary according to this embodiment; and FIG. 14 is a drawing showing an example of scene modifier representations finally obtained when scene information is applied to text scenarios according to this embodiment.

BEST MODE FOR CARRYING OUT THE INVENTION

Embodiments of the present invention will now be described in detail with reference to the accompanying drawings.

Embodiment 1

Figure 1:
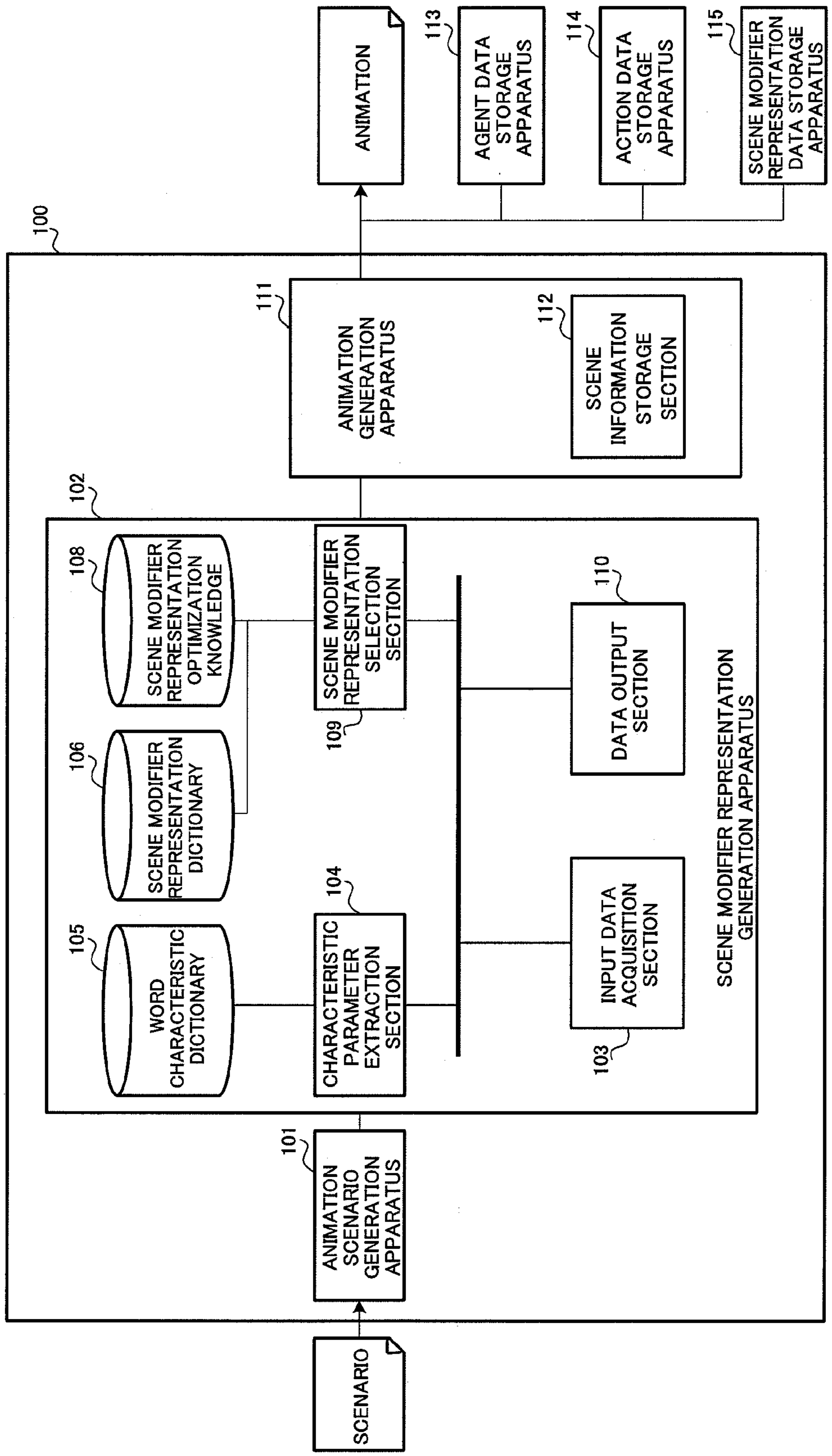
FIG. 1 is a drawing showing an example of the configuration of a computer graphics animation creation system that includes a scene modifier representation generation apparatus according to Embodiment 1 of the present invention.

A computer graphics animation creation system that includes a scene modifier representation generation apparatus according to Embodiment 1 of the present invention will now be described using FIG. 1. FIG. 1 is a drawing showing an example of the configuration of a computer graphics animation creation system that includes a scene modifier representation generation apparatus according to Embodiment 1 of the present invention.

A computer graphics animation creation system 100 according to this embodiment is composed of an animation scenario generation apparatus 101 that extracts information relating to an agent and an action thereof from a text scenario input by a user, a scene modifier representation generation apparatus 102 that generates a scene-related modifier representation (hereinafter referred to as "scene modifier representation") to be added to animation, and an animation generation apparatus 111 that generates final computer graphics animation.

Animation scenario generation apparatus 101 extracts information relating to an agent and an action thereof, and the object, place, time, and so forth, of the action, from an input text scenario (hereinafter referred to simply as "scenario"), and outputs these extracted items of information and a scenario for animation (hereinafter referred to as "animation scenario") derived from these items of information.

For example, if the input scenario is "Taro ran hurriedly", "Taro" is extracted as agent information, "run" as agent action information, and "hurry" as "run" modifier information, and the animation scenario "Taro ran hurriedly" is generated from these items of information. Here, "hurriedly" is extracted as a scenario characteristic parameter by a characteristic parameter extraction section 104 described later herein.

If the input scenario is "Hanako had a brainwave", "Hanako" is extracted as agent information, and "clap hands" as agent action information, and the animation scenario "Hanako clapped her hands" is generated from these items of information. Here, "brainwave" in the scenario is represented by the action "clap hands", but this is not a limitation. For example, various representation methods such as "open eyes wide" or "snap fingers" are possible in addition to "clap hands".

Scene modifier representation generation apparatus 102 is provided with an input data acquisition section 103 and a data output section 110 as apparatuses performing data input/output from/to other apparatuses such as animation scenario generation apparatus 101 and animation generation apparatus 111.

Input data acquisition section 103 acquires animation scenario generation apparatus 101 output—that is, in this embodiment, an agent included in a scenario and an action thereof, together with the scenario itself—as input data. Input data acquisition section 103 also acquires scene information sent from animation generation apparatus 111. Input data acquisition section 103 sends the acquired scenario to characteristic parameter extraction section 104, and the scene information to a scene modifier representation selection section 109.

Data output section 110 outputs a scene modifier representation to animation generation apparatus 111.

Scene modifier representation generation apparatus 102 is provided with a word characteristic dictionary 105. Word characteristic dictionary 105 associates a word with a characteristic parameter for that word, and is used by characteristic parameter extraction section 104. Word characteristic dictionary 105 will be described in detail later herein using FIG. 2. FIG. 2 is a drawing showing an example of a word characteristic dictionary according to this embodiment.

As shown in FIG. 2, word characteristic dictionary 105 stores a plurality of sets comprising an identification number 210, a word (including a combination of words) 202, and a characteristic parameter 203 indicating a characteristic of an action corresponding to word 202.

For example, characteristic parameter 203 $(hurry) indicating hurry is associated with word 202 "hurriedly". Also, word combination 202 "extremely"+$$(characteristic parameter) indicates Add(+, $$ characteristic parameter)—that is, the addition of + to the characteristic parameter. The symbol "+" means emphasis, and therefore Add(+, $$ characteristic parameter) indicates that the characteristic parameter is to be emphasized.

When word 202 "all out" follows a word expressing a locomotive action, characteristic parameter 203 $(hurry++) indicating extreme hurry is associated therewith, and when followed by a word 202 expressing an emotive action, characteristic parameter 203 $(exaggeration++) indicating an extremely exaggerated action is associated therewith. The symbol "++" indicates a greater degree of emphasis than the symbol "+".

A corresponding characteristic parameter 203 is also assigned to a word combination 202 in this way.

Characteristic parameter 203 $(exaggeration+) indicating extreme exaggeration is assigned to word 202 "wail". In this way, a characteristic parameter 203 is associated with a word 202 that is not an adverb but connotes an adverbial meaning.

Characteristic parameter 203 $(exaggeration) indicating exaggeration is assigned to word combination 202 "extremely"@$$(action verb).

Characteristic parameter 203 $(exaggeration) indicating exaggeration, or $$(onomatopoeia) indicating an onomatopoeic or mimetic word such as "boohoo" or "pit-a-pat", is assigned to word combination 202 "boohoo"@$$(action verb).

Characteristic parameter 203 $(fear) indicating fear is assigned to word 202 "scream", and characteristic parameter 203 $(brainwave) indicating a brainwave is assigned to word 202 "have a brainwave".

Characteristic parameter 203 $(stun) indicating a state of being stunned is assigned to words 202 "stunned" and "staggered".

Example No. 10, unlike the other examples, is a description whereby the degree of emphasis of characteristic parameter 203 is determined by the size of the description font when the scenario is input. Thus, a characteristic parameter 203 is associated with not only the meaning of characters but also the character font.

Word characteristic dictionary 105 is configured in this way.

Next, characteristic parameter extraction section 104 will be described. Characteristic parameter extraction section 104 extracts characteristic parameter 203 from a scenario that has been sent, and sends this to scene modifier representation selection section 109. Specifically, characteristic parameter extraction section 104 references word characteristic dictionary 105, and extracts characteristic parameter 203 corresponding to word 202 included in the scenario. In other words, characteristic parameter extraction section 104 extracts characteristic parameter 203 indicating a characteristic of a scenario from that scenario.

Input to characteristic parameter extraction section 104 and output from characteristic parameter extraction section 104 will now be described using FIG. 3. FIG. 3 is a drawing showing an example of text scenarios 301 and agents 302, actions 303, and characteristic parameters 203 obtained therefore according to this embodiment.

Word characteristic dictionary 105 used in examples No. 1 through No. 8 in FIG. 3 corresponds to No. 1 through No. 8 in FIG. 2. Similarly, word characteristic dictionary 105 used in example No. 9 in FIG. 3 corresponds to No. 9 and No. 10 in FIG. 2, word characteristic dictionary 105 used in example No. 10 in FIG. 3 corresponds to No. 11 in FIG. 2, and word characteristic dictionary 105 used in examples No. 11 and No. 12 in FIG. 3 corresponds to No. 12 in FIG. 2.

Underlined parts in scenario 301 in FIG. 3 are parts applied to word characteristic dictionary 105 in FIG. 2.

As can be seen from the examples in FIG. 2 and FIG. 3, there are examples in which different characteristic parameters are obtained for the same representation words in scenario 301 ("all out") and, conversely, there are examples in which the same characteristic parameter is obtained for different representations in scenario 301 ("cry extremely" and "cry 'boohoo'", "staggered" and "stunned").

Thus, by using word characteristic dictionary 105, characteristic parameter extraction section 104 can easily extract a characteristic parameter 203 corresponding to a word or word combination 202. Also, since characteristic parameters 203 corresponding to a meaning connoted by a word or word combination 202 are also associated in word characteristic dictionary 105, characteristic parameter extraction section 104 can extract a characteristic parameter 203 corresponding to a meaning connoted by a scenario 301.

Scene modifier representation generation apparatus 102 is also provided with a scene modifier representation dictionary 106 that stores information used by scene modifier representation selection section 109, and scene modifier representation optimization knowledge 108.

Scene modifier representation dictionary 106 will be described using FIG. 4. FIG. 4 is a drawing showing an example of a scene modifier representation dictionary according to this embodiment.

Scene modifier representation dictionary 106 is composed of sets comprising a dictionary ID 401 that is an identification number, dictionary item match conditions 402, and scene modifier representations 403 obtained when those conditions 402 are matched.

Match conditions 402 comprise an agent 302 and action 303 in FIG. 3 in an animation scenario generated by animation scenario generation apparatus 101, together with a characteristic parameter 203 in FIG. 3 extracted by characteristic parameter extraction section 104.

Agent 302 indicates whether agent 302 is a human being, an animal, an inanimate object, etc. Action 303 may indicate a concrete action such as running, crying, etc., or may indicate a meta-type of some kind of action or some kind of state, such as joy or sadness—that is, a generic action other than a concrete action. Characteristic parameter 203 content is as shown in FIG. 2, but in match conditions 402 of scene modifier representation dictionary 106, if it is not necessary to divide the dictionary on a characteristic parameter 203 magnitude basis, a plurality of characteristic parameter magnitudes can be written as a condition linked by the symbol "|" as in the case of dictionary ID 001 and dictionary ID 002. Here, the symbol "|" indicates an "or" condition. In this example, three characteristic parameters are linked, but the number of characteristic parameters is not limited to this, and any number of characteristic parameters may be linked as a condition.

Depending on dictionary ID 401, a plurality of scene modifier representations 403 may be associated. For example, when dictionary ID 401 is "001", "004", "008", etc., a plurality of scene modifier representations 403 are associated.

It can be seen that, by using such a scene modifier representation dictionary 106, when, for example, match conditions 402 indicate "agent@$$(human being), action@$(nm), characteristic parameter=$(hurry), $(hurry+), or $(hurry++)"—that is, "a human being runs hurriedly"—(dictionary ID 401=001), scene modifier representations 403 are "Draw running lines ($(line type)) in overall scene", "Draw lines ($(quantity), $(line type)) behind agent space", and "Agent's face has gritted teeth". Here, lines ($(line type), $line(quantity)) indicates that the line type and quantity of lines to be used are determined by means of scene modifier representation optimization knowledge 108 described later herein.

"Agent space" here is the space immediately surrounding the body of an agent, and is a space in which, when a representation is assigned, it is intended to apply the representation in the vicinity of an object indicating agent 302 without overlapping that object.

When match conditions 402 indicate "agent@$$(human being), action@$(cry), characteristic parameter=$(exaggeration), $(exaggeration+), or $(exaggeration++)"—that is, "a human being cries exaggeratedly"—(dictionary ID 401=002), scene modifier representation 403 indicates "Make tears ($(quantity)) run down agent's face". Here, tears ($(quantity)) indicates that the quantity of tears to run down the agent's face is determined by means of scene modifier representation optimization knowledge 108 described later herein.

When match conditions 402 indicate "agent@$$(human being), action@$$(action), characteristic parameter=$$(onomatopoeia)"—that is, "a human being emits an onomatopoeic/mimetic sound"—(dictionary ID 401=003), scene modifier representation 403 indicates "Display $$(onomatopoeia) ($(size)) above agent space"—that is, indicates that an onomatopoeic expression is to be displayed above a human being. Here, tears ($(size)) indicates that the size for displaying the onomatopoeic expression is determined by means of scene modifier representation optimization knowledge 108 described later herein.

When match conditions 402 indicate "agent@$$(human being), action@$$(action), characteristic parameter=$$ (fear), $$(fear+), or $$(fear++)"—that is, "a human being acts while feeling afraid"—(dictionary ID 401=004), scene modifier representation 403 indicates "Make agent's (human being's) hair stand on end" and "Display text ($(font), $(size)) 'That's scary!' above agent (human being) space". Here, text ($(font), $(size)) indicates that the font and size of the text to be displayed is determined by means of scene modifier representation optimization knowledge 108 described later herein.

When match conditions 402 indicate "agent@$$(human being), action@$(clap hands), characteristic parameter=$ (brainwave)"—that is, "a human being has a brainwave about something and claps his/her hands"—(dictionary ID 401=005), scene modifier representation 403 indicates "Emit agent's (human being's) $(clap hands) sound ($(size)) and draw lines ($(quantity)) for emission of loud sound". Here, emit sound $(size) indicates that the magnitude of the sound is determined by means of scene modifier representation optimization knowledge 108 described later herein.

When match conditions 402 indicate "agent@$$(human being), action@$$(action), characteristic parameter=$ (brainwave)"—that is, "a human being has a brainwave about something and performs some kind of action"—(dictionary ID 401=006), scene modifier representation 403 indicates "Display character ($(font), $(size)) '!' above agent (human being) space".

When match conditions 402 indicate "agent@$$(human being), action@$(eat), characteristic parameter=$(stun)" that is, "a human being eats something in a stunned way"—(dictionary ID 401=007) scene modifier representation 403 indicates "Agent (human being) drops $(eating utensil) or $(food) held in his/her hand". Here, $(eating utensil) or $(food) is determined by means of scene modifier representation optimization knowledge 108 described later herein.

When match conditions 402 indicate "agent@$$(human being), action@$$(action), characteristic parameter=$ (stun)"—that is, "a human being performs some kind of action in a stunned way"—(dictionary ID 401=008), scene modifier representation 403 indicates "Movement of agent (human being) stops ($(length)), draw lines on face ($(quantity))" or "Movement of active subject other than agent stops ($(length)), draw lines on face ($(quantity))". Here, ($(length)) indicates that the length of time for which an action of the agent or an active subject other than the agent stops is determined by means of scene modifier representation optimization knowledge 108 described later herein, and draw lines ($(quantity)) indicates that the quantity of lines drawn on the face is determined by means of scene modifier representation optimization knowledge 108 described later herein.

By using scene modifier representation dictionary 106 configured in this way, scene modifier representations 403 can be determined from match conditions 402. That is to say, a scene modifier representation corresponding to a scenario can be determined.

Various kinds of representations other than those shown in FIG. 4 can be applied as scene modifier representations 403, including representations assigned to an overall scene, to an agent space, or to an agent. That is to say, scene modifier representations 403 shown in FIG. 4 are simply examples of conceivable scene modifier representation variations, and various other kinds of scene modifier representations can also be used. Other scene modifier representation variations are further described below.

Examples of scene modifier representations applied to an overall scene include those that transform an overall scene (by changing everything to an ink-painting style, an oil-painting style, or sepia tones, for instance); that apply an additional representation to a scene (by drawing background lines expressing speed or conveying a sense of shock, adding bird-song to represent morning, and so forth); and that replace a component element of part of a scene with another component element (such as by suddenly changing the backdrop to a sandy beach when the hero's girlfriend runs toward him).

It is also possible to apply a scene modifier representation to the background of agent 302 that is, the agent space. As explained above, "agent space" is the space immediately surrounding the body of an agent, and is a space in which, when a representation is assigned, it is intended to apply the representation in the vicinity of an object indicating agent 302 without overlapping that object. Examples of scene modifier representations assigned to this agent space include those that apply to the overall agent space (for instance, by drawing lines indicating speed behind the running form of an agent, shining a spotlight on agent 302, providing a "Screech!" sound effect when an agent stops abruptly, and so forth); that insert text in the background of agent 302 (for instance, directly writing an onomatopoeic expression such as "Waaah!", writing a symbol such as "!" (exclamation mark) or "♪" (a musical note) or directly writing other characters of some kind in the background); and that place another object in the background of the agent space (for example, drawing a rose in the background, drawing pigs and pearls when the surface expression "pearls before swine" is used, showing a bee when the expression "busy as a bee" is used, using a question mark or heart in a speech balloon, and so forth).

Examples of scene modifier representations that are applied to the face or body of an agent 302 include those that distort part of the face or body (such as by making the face round, making the eyes droopy, lowering the position of the eyes, dropping the upper lip, reaching out, making the hair stand on end, and so forth); that change the number of parts of the face or body (such as by sprouting numerous arms or legs); that apply an additional representation to part of the face or body (such as by drawing vertical lines to apply a sense of shock to part of the face, drawing hearts or stars in the eyes, causing an extravagant quantity of tears to flow, reddening the cheeks, and so forth); and that replace part of the face or body with another (for example, replacing the agent's face with somebody else's).

Examples of scene modifier representations that are applied to an action of an agent 302 include those that change an action of some part of the agent (such as rotating the arms), and those that affect the overall movement of the agent (such as stopping, slowing down, or speeding up the movement of the agent).

Examples of scene modifier representations that are applied to the belongings or clothing of an agent 302 include those that change the shape of the agent's belongings or clothing (such as making a watch or hat larger or smaller), and those that give the agent new belongings or clothing (such as providing the agent with a placard bearing text, or clothing the agent in skiwear).

When animation to be generated is 3D (3-dimensional)—that is, when scene modifier is implemented by means of 3-dimensional graphics—a scene modifier representation corresponding to a scenario can be implemented by changing the projection method. Examples of scene modifier application by changing the 3D animation projection method include the use of a distorted projection area (such as by providing a close-up of only the face, or taking an extremely long shot); shifting the projection area (such as by rotating the screen about the subject, or zooming-in rapidly from a distance); and changing the light source when shooting (such as by placing the light source on the ground).

These scene modifier representations may have various kinds of variables such as $(quantity) and $(size) embedded in them according to their content. For instance, in the above examples, when lines are drawn on the scene background or an agent's face, the line location, number, thickness, and tone are variables. Also, when part of an agent's face or body is distorted, the amount of distortion is a variable. Furthermore, when a scene modifier representation is accompanied by a sound, the tone and volume are variables. These variables are determined in scene modifier representation selection section 109 processing, as described later herein.

Scene modifier representation dictionary 106 is configured in this way.

Next, scene modifier representation selection section 109 will be described. Scene modifier representation selection section 109 selects a scene modifier representation 403 that matches application conditions 402 of scene modifier representation dictionary 106. Also, if there are a plurality of scene modifier representations 403 that match application conditions 402, scene modifier representation selection section 109 applies scene information of computer graphics animation to scene modifier representation optimization knowledge 108 and performs optimization of scene modifier representation. Furthermore, if there are variables in a scene modifier representation 403, scene modifier representation selection section 109 applies scene information and characteristic parameters to scene modifier representation optimization knowledge 108 and performs scene modifier representation 403 optimization.

Scene modifier representation selection section 109 acquires scene information from a scene information storage section 112 managed by animation generation apparatus 111. Specifically, animation generation apparatus 111 stores details of what kinds of scenes have been generated as actual animation in scene information storage section 112 as scene information. That is to say, scene information is information relating to component elements of scenes for generating animation. Scene modifier representation selection section 109 acquires scene information data stored in scene information storage section 112 via input data acquisition section 103.

In this embodiment, scene information storage section 112 is provided in animation generation apparatus 111, but the present invention is not limited to this case, and an aspect is also possible in which scene information storage section 112 is provided in scene modifier representation generation apparatus 102.

Scene information will now be described.

When using a visual representation such as animation, items not described in the text in question also have to be expressed in concrete terms. For example, information relating to the hero's costume is often not specially mentioned when such information not particularly important, but in an animation representation some kind of costume must be depicted. Also, in a scene in which the hero and a secondary hero are talking, for example, there are various possible animation representations, such as representing only the hero, or also representing the secondary hero being spoken to in the same screen. And in a scene in which the hero is laughing, for example, the scenario may not include information as to where the hero actually is, or whether the hero is standing or sitting, so that there are representational variations when actually representing the scene. As scene modifier representations are applied to such varied animation scene modifier representations themselves, information as to what kind of scene is represented is necessary in animation generation apparatus 111. This information is scene information.

Concrete examples of scene information will now be described using FIG. 5 (A) through FIG. 5 (C). FIG. 5 (A) through FIG. 5 (C) are drawings showing examples of scene information according to this embodiment. As shown in FIG. 5 (A) through FIG. 5 (C), scene information 500*a* through scene information 500*c* comprise information as to subjects (agents), location, objects, and time, for example. Scene information 500*a* indicates that action-capable subjects appearing in the scene are Taro and Hanako, the location is a park, objects represented in the scene are a slide and horizontal bars, and the time is night. Similarly, scene information 500*b* indicates that the only action-capable subject is Hanako, the location and objects are the same as in Scene 1, and the time is day, and scene information 500*c* indicates that action-capable subjects are Hanako and Taro, the location is a restaurant, objects are forks, and the time is night.

Information other than the above may also be added as information making up scene information.

Next, scene modifier representation optimization knowledge 108 used by scene modifier representation selection section 109 will be described using FIG. 6. FIG. 6 is a drawing showing an example of scene modifier representation optimization knowledge according to this embodiment.

Scene modifier representation optimization knowledge 108 includes knowledge for selecting a scene modifier representation to be used according to scene information content, and knowledge for determining how to set a value of a variable embedded in a scene modifier representation according to scene information or a characteristic parameter.

Specifically, scene modifier representation optimization knowledge 108 is composed of sets each comprising a knowledge ID 601 that is a knowledge identification number, a knowledge application condition 602 that is a knowledge application condition, and scene modifier representation optimization content 603 that is effective when matched with knowledge application condition 602.

A knowledge application condition 602 is a condition for scene information, a previously obtained characteristic parameter 203, or a scene modifier representation for which there is a possibility of selection. In FIG. 6, "$(scene)" indicates scene information, "$(characteristic parameter)" indicates a previously obtained characteristic parameter 203, and "$(scene modifier representation)" indicates a set of scene modifier representations for which there is a possibility of selection.

Scene modifier representation optimization content 603 indicates an optimization method as to which is to be selected preferentially from a set of a plurality of scene modifier representations, or how a value of a variable embedded in a scene modifier representation is to be set. With regard to the preferential selection method, when a plurality of contents are described, content in a higher position is in principle applied preferentially. However, there is also a method that is invariably applied exceptionally. The concrete operation will be explained in detail in the description of scene modifier representation selection section 109 operation.

Knowledge for which knowledge ID 601 is 001 through 003 is knowledge indicating which is to be selected preferentially from a set of a plurality of scene modifier representations. Knowledge for which knowledge ID 601 is 004 through 006 is knowledge indicating how a value of a variable embedded in a scene modifier representation is to be set. Knowledge for which knowledge ID 601 is 007 includes both knowledge indicating which is to be selected preferentially from a set of a plurality of scene modifier representations and knowledge indicating how a value of a variable embedded in a scene modifier representation is to be set.

Specifically, when knowledge application condition 602 is "$(scene) component subject is one person"—that is, indicating "one subject is mentioned in scene information"—(knowledge ID=001), scene modifier representation optimization content 603 is "Give preference to representation for overall scene", or if this is not possible, "Give preference to representation for agent or agent space".

When knowledge application condition 602 is "$(scene) component subject is plural"—that is, indicating "a plurality of subjects are mentioned in scene information"—(knowledge ID=002), scene modifier representation optimization content 603 is "Give preference to representation relating to active subject other than agent if available", or if this is not possible, "Give preference to representation for agent or agent space".

When knowledge application condition 602 is "text application condition present in $(scene modifier representation)"—that is, indicating "text ($font), ($size) present in scene modifier representation"—(knowledge ID=003), since a method with "©" attached indicates a method invariably applied exceptionally, in this example scene modifier representation optimization content 603 is that "Give preference to text application" is invariably applied exceptionally.

When knowledge application condition 602 is "$(scene) time is $(day)"—that is, indicating "scene information time is day"—(knowledge ID=004), scene modifier representation optimization content 603 is "Make line color dark"—that is, "use a dark color for line ($ line type) parts of scene modifier representation".

When knowledge application condition 602 is "$(scene) time is $(night)"—that is, indicating "scene information time is night"—(knowledge ID=005), scene modifier representation optimization content 603 is "Make line color white"—that is, "use white for line ($ line type) parts of scene modifier representation".

When knowledge application condition 602 is "$(characteristic parameter) has +" (knowledge ID=006), scene modifier representation optimization content 603 is "Make 30% increase in values of $(quantity), $(size), and $(length) of item represented"—that is, "when $(quantity), $(size), and $(length) variables are embedded in scene modifier representation, increase their values by 30%".

When knowledge application condition 602 is "$(characteristic parameter) has ++" (knowledge ID=007) scene modifier representation optimization content 603 is "Make 60% increase in values of $(quantity), $(size), and $(length) of item represented", and, since a method with "◎" attached indicates a method invariably applied exceptionally, in this example is furthermore "Make multiple selections when there are multiple scene modifier representations for which application is possible".

Scene modifier representation selection section 109 references scene modifier representation dictionary 106 and selects a match conditions 402 that match agent 302, action 303, and characteristic parameter 203. Then scene modifier representation 403 corresponding to the selected match conditions 402, scene modifier representation optimization knowledge 108, scene information 500, and characteristic parameter 203, is optimized and output.

Scene modifier representation generation apparatus 102 is configured in this way.

Next, animation generation apparatus 111 will be described.

Animation generation apparatus 111 has an agent, action, and scene modifier representation from scene modifier representation generation apparatus 102 as input, and generates animation using agent data corresponding to the input agent, action data corresponding to the input action, and scene modifier representation data corresponding to the input scene modifier representation.

Agent data is stored in an agent data storage apparatus 113, action data is stored in an action data storage apparatus 114, and scene modifier representation data is stored in a scene modifier representation data storage apparatus 115. Agent data is coordinate data or texture data indicating an agent, and action data is matrix data for moving an agent. Scene modifier representation data image data, text data, voice data, and so forth for implementing a scene modifier representation.

Agent data storage apparatus 113, action data storage apparatus 114, and scene modifier representation data storage apparatus 115 may be external or internal to computer graphics animation creation system 100.

Computer graphics animation creation system 100 is configured as described above.

Next, the operation of computer graphics animation creation system 100 will be described.

Figure 7:
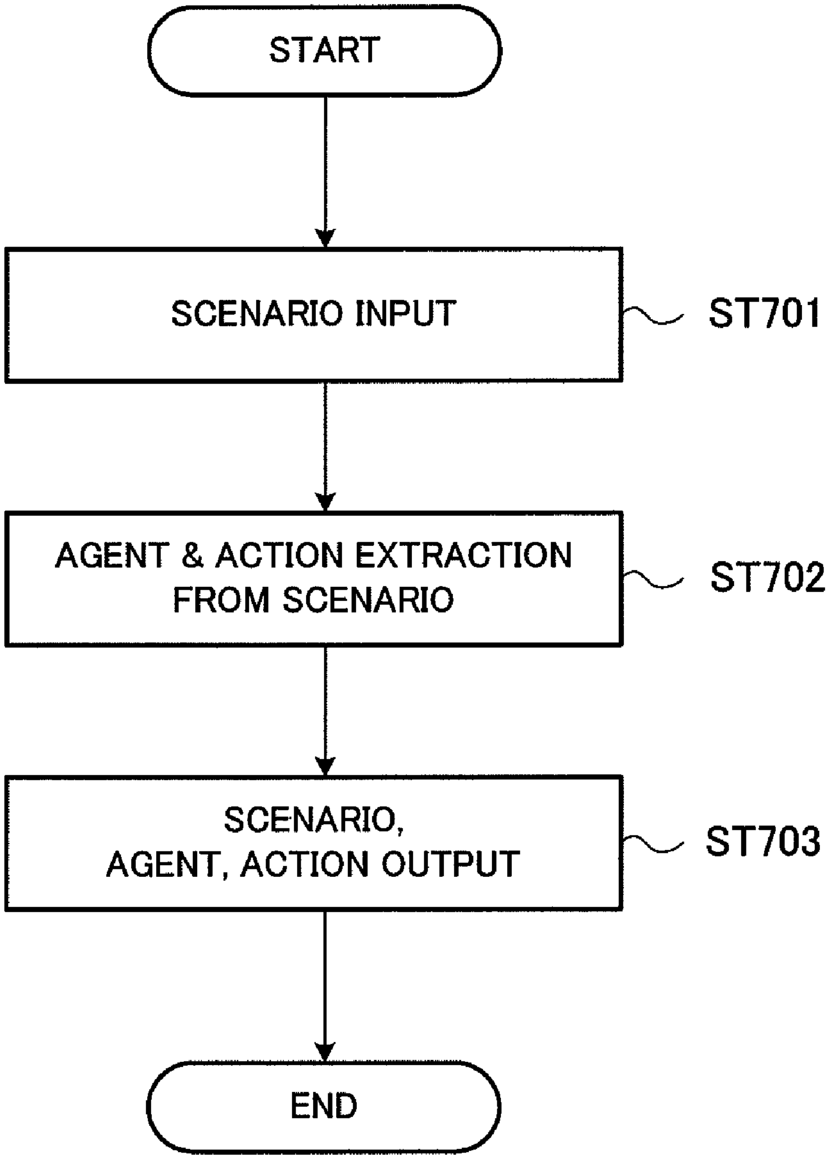
FIG. 7 is a flowchart showing an example of the operation of the animation scenario generation apparatus shown in FIG. 1.

First, the operation of animation scenario generation apparatus 101 will be described using FIG. 7. FIG. 7 is a flowchart showing an example of the operation of the animation scenario generation apparatus shown in FIG. 1.

First, a scenario that the user wants to animate—for example, "Hanako ran with all her might"—input to computer graphics animation creation system 100 is input to animation scenario generation apparatus 101 (ST701).

Next, information relating to agent 302 and action 303 is extracted from scenario 301 input in ST701. For example, for scenario 301 "Hanako ran with all her might", $(Hanako) is extracted as the agent, and $(nm) as the action (ST702).

Then information relating to agent 302 and action 303 extracted in ST702 is output to scene modifier representation generation apparatus 102 together with scenario 301 input in ST701 (ST703).

A method and contents in general use may be employed as the natural-language analysis method and glossary contents used by animation scenario generation apparatus 101, and therefore descriptions thereof are omitted here.

The action of "Hanako ran with all her might" is intransitive and takes no object, but in the case of a transitive action that takes an object—such as when scenario 301 is "Hanako ate a lot of cake", for example—$(Hanako) is output as the agent, $(eat) as the action, and $(cake) as the object to scene modifier representation generation apparatus 102, together with scenario 301 input in ST701.

As described above, animation scenario generation apparatus 101 outputs agent 302 and action 303 information generated from scenario 301, together with scenario 301, to scene modifier representation generation apparatus 102.

Figure 8:
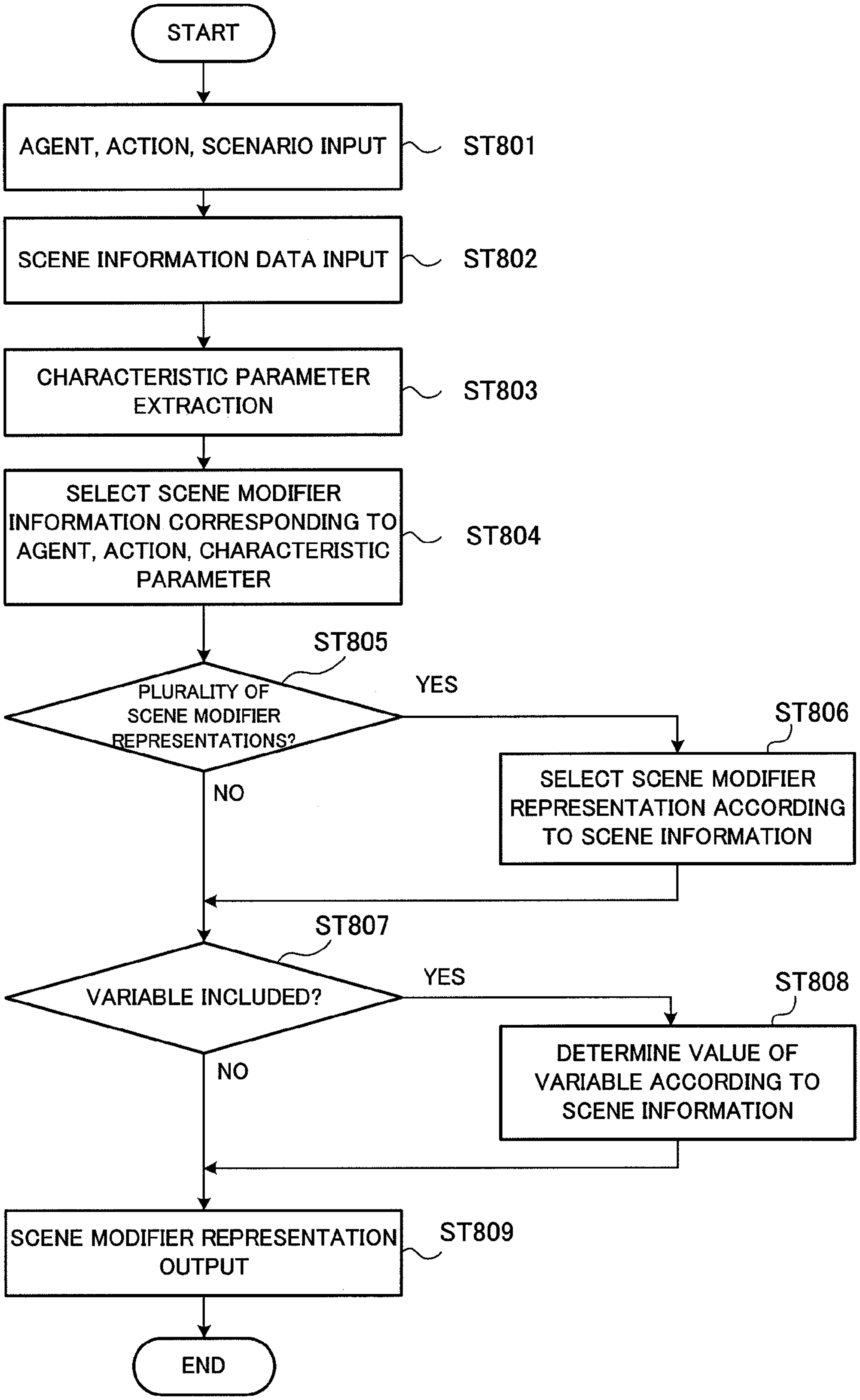
FIG. 8 is a flowchart showing an example of the operation of the scene modifier representation generation apparatus shown in FIG. 1.

Next, the operation of scene modifier representation generation apparatus 102 will be described using the flowchart in FIG. 8. FIG. 8 is a flowchart showing an example of the operation of the scene modifier representation generation apparatus shown in FIG. 1.

First, input data acquisition section 103 receives agent and action information together with a scenario input by the user, sent from animation scenario generation apparatus 101. The input scenario is sent to characteristic parameter extraction section 104 (ST801).

Next, input data acquisition section 103 receives scene information stored in scene information storage section 112 (ST802).

Then characteristic parameter extraction section 104 references word characteristic dictionary 105, applies the agent and action information and scenario input in ST801 sequentially to a word 202, and extracts a characteristic parameter 203 corresponding to an applicable word 202. Characteristic parameter 203 corresponding to extracted word 202 is output to scene modifier representation selection section 109 (ST803).

Then scene modifier representation selection section 109 receives agent and action information input in ST801 and characteristic parameter 203 extracted in ST803, references scene modifier representation dictionary 106, selects match conditions 402 matching the input agent and action information and characteristic parameter 203, and selects scene modifier representation 403 corresponding to selected match conditions 402 (ST804).

Also, scene modifier representation selection section 109 references scene modifier representation optimization knowledge 108, extracts all knowledge application conditions 602 matching scene information of the immediately preceding scene obtained in ST802, the plurality of selected scene modifier representations, and the characteristic parameter extracted in ST803, references all the scene modifier representation optimization content 603 corresponding to extracted knowledge application conditions 602, and assembles a collection of applicable scene modifier representation optimization content.

Next, if there are a plurality of scene modifier representations 403 selected in ST804 (ST805: YES), scene modifier representation selection section 109, using knowledge indicating which should be selected preferentially from a set of a plurality of scene modifier representations among the assembled applicable scene modifier representation optimization content, determines which of the plurality of scene modifier representations 403 selected in ST804 should be applied (ST806), and proceeds to the processing in ST807.

On the other hand, if there are not a plurality of scene modifier representations 403 selected in ST804 (ST805: NO), the processing flow proceeds to the processing in ST807 without execution of the processing in ST806.

Then scene modifier representation selection section 109 determines whether or not a variable is included in scene modifier representation 403 selected in ST804 (ST807). If the result of this determination is that a variable is included (ST807: YES), scene modifier representation selection section 109, using knowledge indicating how a value of a variable embedded in a scene modifier representation should be set among the assembled applicable scene modifier representation optimization content, determines what a variable included in selected scene modifier representation 403 should be made (ST808) and proceeds to the processing in ST809.

On the other hand, if a variable is not included in scene modifier representation 403 selected in ST804 (ST807: NO), the processing flow proceeds to the processing in ST809 without execution of the processing in ST808.

Finally, a scene modifier representation selected by scene modifier representation selection section 109 is output from data output section 110 (ST809).

Concrete examples of the processing whereby scene modifier representation generation apparatus 102 generates a scene modifier representation will now be described using FIG. 9. FIG. 9 is a drawing showing an example of scene modifier representations finally obtained when scene information is applied to the scenarios shown in FIG. 3 according to this embodiment.

A case in which scenario 301 is "Hanako ran hurriedly" and scene information is 500*b* will be considered, for example.

In this case, input data acquisition section 103 receives $(Hanako) as agent 302, $(nm) as action 303, scenario 301, and scene information 500*b* (ST801, ST802). Here, "hurriedly" in scenario 301 accords with word 202 "hurriedly" of the No. 1 entry in word characteristic dictionary 105, and characteristic parameter extraction section 104 extracts $(hurry) as characteristic parameter 203 (ST803). Next, scene modifier representation selection section 109 references scene modifier representation dictionary 106, extracts match conditions 402 matching human-being type data $(Hanako) as agent 302, data $(nm) as action 303, and $(hurry) as characteristic parameter 203 (dictionary ID 401=001) and selects the three items "Draw running lines ($(line type)) in overall scene", "Draw lines ($(quantity), $(line type)) behind agent space", and "Agent's face has gritted teeth" as scene modifier representations 403 corresponding to match conditions 402 (ST804).

Then scene modifier representation selection section 109 references scene modifier representation optimization knowledge 108, and searches for a knowledge ID matching scene information 500*b*, multiple selected scene modifier representations 403, and $(hurry) as characteristic parameter 203. In this case, since there is one subject, Hanako, in scene information 500*b*, the case in which knowledge ID 601 is 001 matches. Also, since the time is $(day) in scene information 500*b*, the case in which knowledge ID 601 is 004 matches. Other knowledge items do not match. Combining these knowledge items, applicable scene modifier representation optimization content is "Give preference to representation for overall scene", or if this is not possible, "Give preference to representation for agent or agent space", constituting knowledge indicating which of a set of a plurality of scene modifier representations 403 should be selected preferentially, and "Make $(line type) a dark color", constituting knowledge indicating how a value of a variable embedded in scene modifier representation 403 is to be set.

Then, since a plurality of scene modifier representations 403 have been selected (ST805: YES), scene modifier representation selection section 109 selects one of scene modifier representations 403 using knowledge indicating which of a set of a plurality of scene modifier representations 403 should be selected preferentially ("Give preference to representation for overall scene", or if this is not possible, "Give preference to representation for agent or agent space"), among applicable scene modifier representation optimization content extracted in the above-described processing. First, scene modifier representation selection section 109 checks whether or not the knowledge "Give preference to representation for overall scene" can be applied. Three scene modifier representations 403—"Draw running lines ($(line type)) in overall scene", "Draw lines ($(quantity), $(line type)) behind agent space", and "Agent's face has gritted teeth"—have been selected, among which there is a "representation for overall scene", namely "Draw running lines ($(line type) in overall scene". Therefore, as a result of applying "Give preference to representation for overall scene", "Draw running lines ($(line type)) in overall scene" is selected as scene modifier representation 403 (ST806) If there were no "representation for overall scene" among the plurality of scene modifier representations 403, the next condition, "Give preference to representation for agent or agent space", would be applied to select one of the plurality of selected scene modifier representations 403.

Then, since there is a variable in scene modifier representation 403 (ST807: YES), scene modifier representation selection section 109 uses knowledge indicating how a value of a variable embedded in scene modifier representation 403 is to be set ("Make $(line type) a dark color") among applicable scene modifier representation optimization content extracted in the above-described processing to generate scene modifier representation 403 "Draw running lines (black) in overall scene" (ST808), and outputs this (ST809).

Next, a case in which scenario 301 is "Hanako ran extremely hurriedly" and scene information is 500*a* will be considered.

In this case, input data acquisition section 103 receives $(Hanako) as agent 302, $(rum) as action 303, scenario 301, and scene information 500*a* (ST801, ST802) Here, "extremely hurriedly" in scenario 301 accords with word 202 of the No. 1 and No. 2 entries in word characteristic dictionary 105, and therefore characteristic parameter extraction section 104 extracts $(hurry+) as characteristic parameter 203 (ST803). Next, scene modifier representation selection section 109 references scene modifier representation dictionary 106, extracts match conditions 402 matching human-being type data $(Hanako) as agent 302, data $(run) as action 303, and $(hurry) as characteristic parameter 203 (dictionary ID 401=001), and selects the three items "Draw running lines ($(line type)) in overall scene", "Draw lines ($(quantity), $(line type)) behind agent space", and "Agent's face has gritted teeth" as scene modifier representations 403 corresponding to match conditions 402 (ST804).

Scene modifier representation selection section 109 references scene modifier representation optimization knowledge 108, and searches for a knowledge ID matching scene information 500*a*, multiple selected scene modifier representations 403, and $(hurry+) as characteristic parameter 203. In this case, since there are two subjects, Taro and Hanako, in scene information 500*a*, the case in which knowledge ID 601 is 002 matches. Also, since the time is $(night) in scene information 500*a*, the case in which knowledge ID 601 is 005 matches. Furthermore, since a "+" symbol is included in $(hurry+) as characteristic parameter 203, the case in which knowledge ID 601 is 006 matches. Other knowledge items do not match. Combining these knowledge items, applicable scene modifier representation optimization content is "Give preference to representation relating to active subject other than agent if available", or if this is not possible, "Give preference to representation for agent or agent space", constituting knowledge indicating which of a set of a plurality of scene modifier representations 403 should be selected preferentially, and "Make $(line type) white" and "Make 30% increase in values of $(quantity), $(size), and $(length) of item represented", constituting knowledge indicating how values of variables embedded in scene modifier representation 403 are to be set.

Next, since a plurality of scene modifier representations 403 have been selected (ST805: YES), scene modifier representation selection section 109 selects one of scene modifier representations 403 using knowledge indicating which of a set of a plurality of scene modifier representations 403 should be selected preferentially ("Give preference to representation relating to active subject other than agent if available", or if this is not possible, "Give preference to representation for agent or agent space"), among applicable scene modifier representation optimization content extracted in the above-described processing. First, scene modifier representation selection section 109 checks whether or not the knowledge "Give preference to representation relating to active subject other than agent if available" can be applied. Three scene modifier representations 403—"Draw running lines ($(line type)) in overall scene", "Draw lines ($(quantity), $(line type)) behind agent space", and "Agent's face has gritted teeth"—have been selected, among which there is no representation relating to an active subject other than the agent—in this case, Taro—and therefore application is not possible. Next, scene modifier representation selection section 109 determines whether or not the knowledge "Give preference to representation for agent or agent space" can be applied. There is a "representation for agent space", namely "Draw lines ($(quantity), $(line type)) behind agent space". Therefore, as a result of applying "Give preference to representation for agent or agent space", "Draw lines ($(quantity), $(line type)) behind agent space" is selected as scene modifier representation 403 (ST806).

Then, since there are variables in scene modifier representation 403 (ST807: YES), scene modifier representation selection section 109 uses knowledge indicating how values of variables embedded in scene modifier representation 403 are to be set ("Make $(line type) white" and "Make 30% increase in values of $(quantity), $(size), and $(length) of item represented"), among applicable scene modifier representation optimization content extracted in the above-described processing, to determine that, within scene modifier representation 403 "Draw lines ($(quantity), $(line type)) behind agent space", the content of $(line type) is to be white and $(quantity) is to be increased by 30%. As a result, scene modifier representation 403 "Draw lines (white) increased by 30% in $(Hanako)'s agent space" is generated (ST808) and output (ST809).

In this way, it is possible for a variable indicating a type included in a scene modifier representation 403 (line ($(line type))) to be optimized based on scene information. Furthermore, it is possible for variables indicating values included in a scene modifier representation 403 (for example, $(quantity), $(size), and $(length)) to be optimized based on a value (+) indicating a degree of emphasis included in characteristic parameters 203. As a result, a suitable representation can be applied to characteristic parameters 203.

Next, a case in which scenario 301 is "Hanako ran all out" and scene information is 500*a* will be considered.

In this case, input data acquisition section 103 receives $(Hanako) as agent 302, $(run) as action 303, scenario 301, and scene information 500*a* (ST801, ST802) Here, $(run)—action 303—in scenario 301 is a locomotive action, and therefore accords with word 202 "all out @$$(locomotive action)" of the No. 3 entry in word characteristic dictionary 105, and characteristic parameter extraction section 104 extracts $(hurry++) as characteristic parameter 203 (ST803). Next, scene modifier representation selection section 109 references scene modifier representation dictionary 106, extracts match conditions 402 matching human-being type data $(Hanako) as agent 302, data $(nm) as action 303, and $(hurry++) as characteristic parameter 203 (dictionary ID 401=001), and selects the three items "Draw running lines ($(line type)) in overall scene", "Draw lines ($(quantity), $(line type)) behind agent space", and "Agent's face has gritted teeth" as scene modifier representations 403 corresponding to match conditions 402 (ST804).

Scene modifier representation selection section 109 references scene modifier representation optimization knowledge 108, and searches for a knowledge ID matching scene information 500*a*, multiple selected scene modifier representations 403, and $(hurry++) as characteristic parameter 203. In this case, since there are two subjects, Taro and Hanako, in scene information 500*a*, the case in which knowledge ID 601 is 002 matches.

Also, since the time is $(night) in scene information 500*a*, the case in which knowledge ID 601 is 005 matches. Furthermore, since the symbol "++" is included in $(hurry++) as characteristic parameter 203, the case in which knowledge ID 601 is 007 matches. Other knowledge items do not match. Combining these knowledge items, applicable scene modifier representation optimization content is "Give preference to representation relating to active subject other than agent if available", or if this is not possible, "Give preference to representation for agent or agent space", as well as "Make multiple selections when there are multiple applicable scene modifier representations 403" given preference exceptionally, constituting knowledge indicating which of a set of a plurality of scene modifier representations 403 should be selected preferentially, and "Make $(line type) white" and "Make 60% increase in values of $(quantity), $(size), and $(length) of item represented", constituting knowledge indicating how values of variables embedded in scene modifier representation 403 are to be set.

Next, since a plurality of scene modifier representations 403 have been selected (ST805: YES), scene modifier representation selection section 109 selects one of scene modifier representations 403 to be used using knowledge indicating which of a set of a plurality of scene modifier representations 403 should be selected preferentially ("Give preference to representation relating to active subject other than agent if available", or if this is not possible, "Give preference to representation for agent or agent space", or "Make multiple selections when there are multiple applicable scene modifier representations 403" given preference exceptionally), among applicable scene modifier representation optimization content extracted in the above-described processing. First, scene modifier representation selection section 109 checks whether or not the knowledge "Make multiple selections when there are multiple applicable scene modifier representations 403" given preference exceptionally can be applied. Since "Draw running lines ($(line type)) in overall scene", "Draw lines ($(quantity), $(line type) behind agent space", and "Agent's face has gritted teeth" cannot all be applied at one time, based on the condition that multiple selections may be made, scene modifier representation selection section 109 next checks whether or not the knowledge "Give preference to representation relating to active subject other than agent if available" can be applied. Three scene modifier representations 403—"Draw running lines ($(line type)) in overall scene", "Draw lines ($(quantity), $(line type)) behind agent space", and "Agent's face has gritted teeth"—have been selected, among which there is no representation relating to an active subject other than $(Hanako) as agent 302—$(Taro) in the case of scene information 500*a*—and therefore it can be seen that the knowledge "Give preference to representation relating to active subject other than agent if available" cannot be applied. Next, scene modifier representation selection section 109 determines whether or not the knowledge "Give preference to representation for agent or agent space" can be applied. There are "representations for agent or agent space", namely "Draw lines ($(quantity), $(line type)) behind agent space" and "Agent's face has gritted teeth", among the plurality of selected scene modifier representations 403. As these two can be applied at one time, as a result of applying "Give preference to representation for agent or agent space" and "Make multiple selections when there are multiple applicable scene modifier representations 403", "Draw lines ($(quantity), $(line type)) behind agent space" and "Agent's face has gritted teeth" are selected as two scene modifier representations 403 (ST806).

Then, since there are variables in scene modifier representation 403 (ST807: YES), scene modifier representation selection section 109 uses knowledge indicating how values of variables embedded in scene modifier representation 403 are to be set ("Make $(line type) white" and "Make 60% increase in values of $(quantity), $(size), and $(length) of item represented"), among applicable scene modifier representation optimization content extracted in the above-described processing, to determine that, within scene modifier representation 403 "Draw lines ($(quantity), $(line type)) behind agent space", the content of $(line type) is to be white and $(quantity) is to be increased by 60%. As a result, two scene modifier representations 403 "Draw lines (white) increased by 60% in $(Hanako)'s agent space" and "$(Hanako) grits her teeth" are generated.

Thus, scene modifier representation selection section 109 decides upon "Draw lines (white) increased by 60% in $(Hanako)'s agent space" and "$(Hanako) grits her teeth" (ST808), and outputs these two (ST809).

In this way, a suitable characteristic parameter 203 can be selected for a combination of adverbial expression "all out" and "ran" indicating an action, and a suitable scene modifier representation 403 can be generated using this characteristic parameter 203.

Next, a case in which scenario 301 is "Hanako cried all out" and scene information is 500*a* will be considered.

In this case, input data acquisition section 103 receives $(Hanako) as agent 302, $(cry) as action 303, scenario 301, and scene information 500*a* (ST801, ST802) Here, $(cry), the action in scenario 301, is an emotive action, and therefore accords with word 202 "all out @$$(emotive action)" of the No. 4 entry in word characteristic dictionary 105, and characteristic parameter extraction section 104 extracts $(exaggeration++) as characteristic parameter 203 (ST803). Next, scene modifier representation selection section 109 references scene modifier representation dictionary 106, extracts match conditions 402 matching human-being type data $(Hanako) as agent 302, data $(cry) as action 303, and $(exaggeration++) as characteristic parameter 203 (dictionary ID 401=002), and selects "Make tears ($(quantity)) run down agent's face" as scene modifier representation 403 corresponding to match conditions 402 (ST804).

Scene modifier representation selection section 109 references scene modifier representation optimization knowledge 108, and searches for a knowledge ID matching scene information 500*a*, selected scene modifier representation 403, and $(exaggeration++) as characteristic parameter 203. In this case, since there are two subjects, Taro and Hanako, in scene information 500*a*, the case in which knowledge ID 601 is 002 matches. Also, since the time is $(night) in scene information 500*a*, the case in which knowledge ID 601 is 005 matches. Furthermore, since the symbol "++" is included in $(exaggeration++) as characteristic parameter 203, the case in which knowledge ID 601 is 007 matches. Other knowledge items do not match. Combining these knowledge items, applicable scene modifier representation optimization content is "Give preference to representation relating to active subject other than agent if available", or if this is not possible, "Give preference to representation for agent or agent space", as well as "Make multiple selections when there are multiple applicable scene modifier representations 403" given preference exceptionally, constituting knowledge indicating which of a set of a plurality of scene modifier representations 403 should be selected preferentially, and "Make $(line type) white" and "Make 60% increase in values of $(quantity), $(size), and $(length) of item represented", constituting knowledge indicating how values of variables embedded in scene modifier representation 403 are to be set.

Then, since a plurality of scene modifier representations 403 are not selected (ST805: NO), scene modifier representation selection section 109 checks whether or not there is a variable in scene modifier representation 403 selected in ST804, and since there are variables in scene modifier representation 403 (ST807: YES), scene modifier representation selection section 109 uses knowledge indicating how values of variables embedded in scene modifier representation 403 are to be set ("Make $(line type) white" and "Make 60% increase in values of $(quantity), $(size), and $(length) of item represented"), among applicable scene modifier representation optimization content extracted in the above-described processing, to determine that, within scene modifier representation 403 "Make tears ($(quantity)) run down agent's face", $(quantity) is to be increased by 60%. As a result, scene modifier representation 403 "Emit $(Hanako)'s tears increased by 60%" is generated (ST808) and output (ST809).

Next, a case in which scenario 301 is "Hanako wailed" and scene information is 500*b* will be considered.

In this case, input data acquisition section 103 receives $(Hanako) as agent 302, $(cry) as action 303, scenario 301, and scene information 500*b* (ST801, ST802). Here, "wail" in scenario 301 accords with word 202 of the No. 5 entry in word characteristic dictionary 105, and therefore characteristic parameter extraction section 104 extracts $(exaggeration+) as characteristic parameter 203 (ST803). Next, scene modifier representation selection section 109 references scene modifier representation dictionary 106, extracts match conditions 402 matching human-being type data $(Hanako) as agent 302, data $(cry) as action 303, and $(exaggeration+) as characteristic parameter 203 (dictionary ID 401=002), and selects "Make tears ($(quantity)) run down agent's face" as scene modifier representation 403 corresponding to match conditions 402 (ST804).

Scene modifier representation selection section 109 references scene modifier representation optimization knowledge 108, and searches for a knowledge ID matching scene information 500*b*, selected scene modifier representation 403, and $(exaggeration+) as characteristic parameter 203. In this case, since there is one subject, Hanako, in scene information 500*b*, the case in which knowledge ID 601 is 001 matches. Also, since the time is $(day) in scene information 500*b*, the case in which knowledge ID 601 is 004 matches. Furthermore, since the symbol "+" is included in $(exaggeration+) as characteristic parameter 203, the case in which knowledge ID 601 is 006 matches. Other knowledge items do not match. Combining these knowledge items, applicable scene modifier representation optimization content is "Give preference to representation for overall scene", or if this is not possible, "Give preference to representation for agent or agent space", constituting knowledge indicating which of a set of a plurality of scene modifier representations 403 should be selected preferentially, and "Make $(line type) a dark color" and "Make 30% increase in values of $(quantity), $(size), and $(length) of item represented", constituting knowledge indicating how values of variables embedded in scene modifier representation 403 are to be set.

Next, since a plurality of scene modifier representations 403 are not selected (ST805: NO), scene modifier representation selection section 109 checks whether or not there is a variable in scene modifier representation 403 selected in ST804, and since there are variables in scene modifier representation 403 (ST807: YES), scene modifier representation selection section 109 uses knowledge indicating how values of variables embedded in scene modifier representation 403 are to be set ("Make $(line type) white" and "Make 30% increase in values of $(quantity), $(size), and $(length) of item represented"), among applicable scene modifier representation optimization content extracted in the above-described processing, to determine that, within scene modifier representation 403 "Make tears ($(quantity)) run down agent's face", $(quantity) is to be increased by 30%. As a result, scene modifier representation 403 "Emit $(Hanako)'s tears increased by 30%" is generated (ST808) and output (ST809).

In this way, a characteristic parameter 203 appropriate to the relevant meaning can be extracted from a word, "wail", that is not an adverb but connotes an adverbial meaning, and a scene modifier representation 403 can be generated using the extracted characteristic parameter 203.

Next, a case in which scenario 301 is "Hanako cried extremely" and scene information is 500*b* will be considered.

In this case, input data acquisition section 103 receives $(Hanako) as agent 302, $(cry) as action 303, scenario 301, and scene information 500*b* (ST801, ST802). Here, $(cry)—action 303 in scenario 301—is an action verb, and therefore accords with word 202 "extremely @$$(action verb)" of the No. 6 entry in word characteristic dictionary 105, and characteristic parameter extraction section 104 extracts $(exaggeration) as characteristic parameter 203 (ST803). Next, scene modifier representation selection section 109 references scene modifier representation dictionary 106, extracts match conditions 402 matching human-being type data $(Hanako) as agent 302, data $(cry) as action 303, and $(exaggeration) as characteristic parameter 203 (dictionary ID 401=002), and selects scene modifier representation 403 "Make tears ($(quantity)) run down agent's face" corresponding to match conditions 402 (ST804).

Scene modifier representation selection section 109 references scene modifier representation optimization knowledge 108, and searches for a knowledge ID matching scene information 500*b*, selected scene modifier representation 403, and $(exaggeration) as characteristic parameter 203. In this case, since there is one subject, Hanako, in scene information 500*b*, the case in which knowledge ID 601 is 001 matches. Also, since the time is $(day) in scene information 500*b*, the case in which knowledge ID 601 is 004 matches. Other knowledge items do not match. Combining these knowledge items, applicable scene modifier representation optimization content is "Give preference to representation for overall scene", or if this is not possible, "Give preference to representation for agent or agent space", constituting knowledge indicating which of a set of a plurality of scene modifier representations 403 should be selected preferentially, and "Make $(line type) a dark color", constituting knowledge indicating how a value of a variable embedded in scene modifier representation 403 is to be set.

Next, since a plurality of scene modifier representations 403 are not selected (ST805: NO), scene modifier representation selection section 109 checks whether or not there is a variable in scene modifier representation 403 selected in ST804, and since there is a variable in scene modifier representation 403 (ST807: YES), scene modifier representation selection section 109 references knowledge indicating how a value of a variable embedded in scene modifier representation 403 is to be set, among applicable scene modifier representation optimization content extracted in the above-described processing, but since there is no matching item, scene modifier representation selection section 109 generates scene modifier representation 403 "Emit $(Hanako)'s tears" (ST808), and outputs this (ST809).

Next, a case in which scenario 301 is "Hanako cried 'boo-hoo'" and scene information is 500*a* will be considered.

In this case, input data acquisition section 103 receives $(Hanako) as agent 302, $(cry) as action 303, scenario 301, and scene information 500*a* (ST801, ST802) Here, "cry 'boo-hoo'" in scenario 301 accords with word 202 of the No. 7 entry in word characteristic dictionary 105, and therefore characteristic parameter extraction section 104 extracts two items, $(exaggeration) and $$(onomatopoeia), as characteristic parameters 203 (ST803). Next, scene modifier representation selection section 109 references scene modifier representation dictionary 106, extracts match conditions 402 matching human-being type data $(Hanako) as agent 302, data $(cry) as action 303, and characteristic parameter 203 ($(exaggeration) or $$(onomatopoeia)) (dictionary ID 401=002, 003), and selects "Make tears ($(quantity)) run down agent's face" and "Display $$(onomatopoeia) ($(size)) above agent space" as scene modifier representations 403 corresponding to match conditions 402 (ST804).

Scene modifier representation selection section 109 references scene modifier representation optimization knowledge 108, and searches for a knowledge ID matching scene information 500*a*, selected scene modifier representations 403, and $(exaggeration) as characteristic parameter 203. In this case, since there are two subjects, Taro and Hanako, in scene information 500*a*, the case in which knowledge ID 601 is 002 matches. Also, since there is a text application condition in a selected scene modifier representation 403, the case in which knowledge ID 601 is 003 matches. Furthermore, since the time is $(night) in scene information 500*a*, the case in which knowledge ID 601 is 005 matches. Other knowledge items do not match. Combining these knowledge items, applicable scene modifier representation optimization content is "Give preference to representation relating to active subject other than agent if available", or if this is not possible, "Give preference to representation for agent or agent space", as well as "Give preference to text application" given preference exceptionally, constituting knowledge indicating which of a set of a plurality of scene modifier representations 403 should be selected preferentially, and "Make $(line type) white", constituting knowledge indicating how a value of a variable embedded in scene modifier representation 403 is to be set.

Next, since a plurality of scene modifier representations 403 have been selected (ST805: YES), scene modifier representation selection section 109 selects which of scene modifier representations 403 is to be used using knowledge indicating which of a set of a plurality of scene modifier representations 403 should be selected preferentially ("Give preference to representation relating to active subject other than agent if available", or if this is not possible, "Give preference to representation for agent or agent space", as well as "Give preference to text application" given preference exceptionally), among applicable scene modifier representation optimization content extracted in the above-described processing. First, scene modifier representation selection section 109 checks whether or not the knowledge "Give preference to text application" given preference exceptionally can be applied. There is a representation "Display $$(onomatopoeia) ($(size)) above agent space" corresponding to "Give preference to text application". Therefore, as a result of applying "Give preference to text application", "Display $$(onomatopoeia) ($(size)) above agent space" corresponding to "Give preference to text application" is selected as scene modifier representation 403 (ST806).

Then, since there is a variable in scene modifier representation 403 (ST807: YES), scene modifier representation selection section 109 references knowledge indicating how a value of a variable embedded in scene modifier representation 403 is to be set, among applicable scene modifier representation optimization content extracted in the above-described processing, but since there is no matching item, scene modifier representation selection section 109 generates scene modifier representation 403 "Display text 'Boohoo' above $(Hanako)'s agent space" (ST808), and outputs this (ST809).

In this way, when an onomatopoeic expression such as "boohoo" is input, it is possible to generate a scene modifier representation 403 that indicates the input onomatopoeic expression appropriately and strongly by displaying that onomatopoeic expression.

Next, a case in which scenario 301 is "Hanako gave a scream" and scene information is 500 a will be considered.

In this case, input data acquisition section 103 receives $(Hanako) as agent 302, $(scream) as action 303, scenario 301, and scene information 500*a* (ST801, ST802). Here, "give a scream" in scenario 301 accords with word 202 of the No. 8 entry in word characteristic dictionary 105, and therefore characteristic parameter extraction section 104 extracts $(fear++) as characteristic parameter 203 (ST803). Next, scene modifier representation selection section 109 references scene modifier representation dictionary 106, extracts match conditions 402 matching human-being type data $(Hanako) as agent 302, data $(scream) as action 303, and $(fear++) as characteristic parameter 203 (dictionary ID 401=004), and selects "Make agent's hair stand on end" and "Display text ($(font), $(size)) 'That's scary!' above agent space" as scene modifier representations 403 corresponding to match conditions 402 (ST804).

Scene modifier representation selection section 109 references scene modifier representation optimization knowledge 108, and searches for a knowledge ID matching scene information 500*a*, multiple selected scene modifier representations 403, and $(fear++) as characteristic parameter 203. In this case, since there are two subjects, Taro and Hanako, in scene information 500*a*, the case in which knowledge ID 601 is 002 matches. Also, since there is a text application condition in a selected scene modifier representation 403, the case in which knowledge ID 601 is 003 matches. Furthermore, since the time is $(night) in scene information 500*a*, the case in which knowledge ID 601 is 005 matches. In addition, since the symbol "++" is included in $(fear++) as characteristic parameter 203, the case in which knowledge ID 601 is 007 matches. Other knowledge items do not match. Combining these knowledge items, applicable scene modifier representation optimization content is "Give preference to representation relating to active subject other than agent if available", or if this is not possible, "Give preference to representation for agent or agent space", as well as "Give preference to text application" given preference exceptionally and "Make multiple selections when there are multiple applicable scene modifier representations 403", constituting knowledge indicating which of a set of a plurality of scene modifier representations 403 should be selected preferentially, and "Make $(line type) white" and "Make 60% increase in values of $(quantity), $(size), and $(length) of item represented", constituting knowledge indicating how values of variables embedded in scene modifier representation 403 are to be set.

Next, since a plurality of scene modifier representations 403 have been selected (ST805: YES), scene modifier representation selection section 109 selects which of scene modifier representations 403 is to be used using knowledge indicating which of a set of a plurality of scene modifier representations 403 should be selected preferentially ("Give preference to representation relating to active subject other than agent if available", or if this is not possible, "Give preference to representation for agent or agent space", as well as "Give preference to text application" and "Make multiple selections when there are multiple applicable scene modifier representations 403" given preference exceptionally), among applicable scene modifier representation optimization content extracted in the above-described processing. First, scene modifier representation selection section 109 checks whether or not the knowledge "Make multiple selections when there are multiple applicable scene modifier representations 403" given preference exceptionally can be applied. As "Make agent's hair stand on end" and "Display text ($(font), $(size)) 'That's scary!' above agent space" can be applied simultaneously, both are selected as scene modifier representations 403.

Then, since there are variables in a scene modifier representation 403 (ST807: YES), scene modifier representation selection section 109 uses knowledge indicating how values of variables embedded in scene modifier representation 403 are to be set ("Make $(line type) white" and "Make 60% increase in values of $(quantity),$(size), and $(length) of item represented"), among applicable scene modifier representation optimization content extracted in the above-described processing, to determine that, within scene modifier representation 403 "Display text ($(font), $(size)) 'That's scary!' above agent space", $(quantity) is to be increased by 60%. As there is no knowledge relating to $(font), this is not applied. As a result, scene modifier representations 403 "Make agent's hair stand on end" and "Display text 'That's scary!' increased in size by 60% above $(Hanako)'s agent space" are generated (ST808) and output (ST809).

Next, a case in which scenario 301 is "Hanako had a brainwave (with 'had a brainwave' font larger than font of other text)" and scene information is 500*c* will be considered.

In this case, input data acquisition section 103 receives $(Hanako) as agent 302, $(clap hands) as action 303, scenario 301, and scene information 500*c* (ST801, ST802). Here, since "had a brainwave" is in scenario 301 and the font of "had a brainwave" is larger than the font of other text, this accords with word 202 of the No. 9 and No. 10 entries in word characteristic dictionary 105, and therefore characteristic parameter extraction section 104 extracts $(brainwave+) and "Add(+, $$ characteristic parameter)" as characteristic parameters 203 (ST803). Next, scene modifier representation selection section 109 references scene modifier representation dictionary 106, extracts match conditions 402 matching human-being type data $(Hanako) as agent 302, data $(clap hands) as action 303, and $(brainwave+) as characteristic parameter 203 (dictionary ID 401=005, 006), and selects "Emit agent's $(clap hands) sound ($(size)) and draw lines ($(quantity)) for emission of loud sound" and "Display character ($(font), $(size)) '!' above agent space" as scene modifier representations 403 corresponding to match conditions 402 (ST804).

Scene modifier representation selection section 109 references scene modifier representation optimization knowledge 108, and searches for a knowledge ID matching scene information 500*c*, multiple selected scene modifier representations 403, and $(brainwave+) as characteristic parameter 203. In this case, since there are two subjects, Taro and Hanako, in scene information 500*c*, the case in which knowledge ID 601 is 002 matches. Also, since there is a text application condition in a selected scene modifier representation 403, the case in which knowledge ID 601 is 003 matches. Furthermore, since the time is $(night) in scene information 500*c*, the case in which knowledge ID 601 is 005 matches. In addition, since the symbol "+" is included in $(brainwave+) as characteristic parameter 203, the case in which knowledge ID 601 is 006 matches. Other knowledge items do not match. Combining these knowledge items, applicable scene modifier representation optimization content is "Give preference to representation relating to active subject other than agent if available", or if this is not possible, "Give preference to representation for agent or agent space", as well as "Give preference to text application" given preference exceptionally, constituting knowledge indicating which of a set of a plurality of scene modifier representations 403 should be selected preferentially, and "Make $(line type) white" and "Make 30% increase in values of $(quantity), $(size), and $(length) of item represented", constituting knowledge indicating how values of variables embedded in scene modifier representation 403 are to be set.

Next, since a plurality of scene modifier representations 403 have been selected (ST805: YES), scene modifier representation selection section 109 selects which of scene modifier representations 403 is to be used using knowledge indicating which of a set of a plurality of scene modifier representations 403 should be selected preferentially ("Give preference to representation relating to active subject other than agent if available", or if this is not possible, "Give preference to representation for agent or agent space", as well as "Give preference to text application" given preference exceptionally), among applicable scene modifier representation optimization content extracted in the above-described processing. First, scene modifier representation selection section 109 checks whether or not the knowledge "Give preference to text application" given preference exceptionally can be applied. As there is a representation relating to "Give preference to text application", namely "Display character ($(font), $(size)) '!' above agent space", this is selected.

Then, since there are variables in a scene modifier representation 403 (ST807: YES), scene modifier representation selection section 109 uses knowledge indicating how values of variables embedded in scene modifier representation 403 are to be set ("Make $(line type) white" and "Make 30% increase in values of $(quantity), $(size), and $(length) of item represented") among applicable scene modifier representation optimization content extracted in the above-described processing, to determine that, within scene modifier representation 403 "Display character ($(font), $(size)) '!' above agent space", $(quantity) is to be increased by 30%. As a result, scene modifier representations 403 "Make agent's hair stand on end" and "Display character increased in size by 30% above $(Hanako)'s agent space" is generated (ST808) and output (ST809).

By changing the font size of text in scenario 301 in this way, characteristic parameter 203 corresponding to text for which the font size has been changed can be emphasized.

Next, a case in which scenario 301 is "Hanako was staggered" and scene information is 500*b* will be considered.

In this case, input data acquisition section 103 receives $(Hanako) as agent 302, $(stand) as action 303, scenario 301, and scene information 500*b* (ST801, ST802). Here, since scenario 301 includes "be staggered", characteristic parameter extraction section 104 extracts $(stunned) of the No. 11 entry in word characteristic dictionary 105 as characteristic parameter 203 (ST803). Next, scene modifier representation selection section 109 references scene modifier representation dictionary 106, extracts match conditions 402 matching human-being type data $(Hanako) as agent 302, data $(stand) as action 303, and $(stunned) as characteristic parameter 203 (dictionary ID 401=008), and selects "Movement of agent stops ($(length)), draw lines on face ($(quantity))" and "Movement of agent or active subject other than agent stops ($(length)), draw lines on face ($(quantity))" as scene modifier representations 403 corresponding to match conditions 402 (ST804).

Scene modifier representation selection section 109 references scene modifier representation optimization knowledge 108, and searches for a knowledge ID matching scene information 500*b*, multiple selected scene modifier representations 403, and $(stunned) as characteristic parameter 203. In this case, since there is one subject, Hanako, in scene information 500*b*, the case in which knowledge ID 601 is 001 matches. Also, since the time is $(day) in scene information 500*b*, the case in which knowledge ID 601 is 004 matches. Other knowledge items do not match. Combining these knowledge items, applicable scene modifier representation optimization content is "Give preference to representation relating to active subject other than agent if available", or if this is not possible, "Give preference to representation for agent or agent space", constituting knowledge indicating which of a set of a plurality of scene modifier representations 403 should be selected preferentially, and "Make $(line type) a dark color", constituting knowledge indicating how a value of a variable embedded in scene modifier representation 403 is to be set.

Then, since a plurality of scene modifier representations 403 have been selected (ST805: YES), scene modifier representation selection section 109 selects which of scene modifier representations 403 is to be used using knowledge indicating which of a set of a plurality of scene modifier representations 403 should be selected preferentially ("Give preference to representation for overall scene", or if this is not possible, "Give preference to representation for agent or agent space"), among applicable scene modifier representation optimization content extracted in the above-described processing. First, scene modifier representation selection section 109 checks whether or not the knowledge "Give preference to representation for overall scene" can be applied. Two scene modifier representations 403—"Movement of agent stops ($(length)), draw lines on face ($(quantity))" and "Movement of agent or active subject other than agent stops ($(length)), draw lines on face ($(quantity))"—have been selected, and there is no "representation for overall scene", so that this cannot be applied. Next, scene modifier representation selection section 109 checks whether or not the knowledge "Give preference to representation for agent or agent space" can be applied. As there is an "agent" related representation, namely "Movement of agent stops ($(length)), draw lines on face ($(quantity))", this is selected.

Then, since there are variables in scene modifier representations 403 (ST807: YES), scene modifier representation selection section 109 references knowledge indicating how values of variables embedded in scene modifier representations 403 are to be set, among applicable scene modifier representation optimization content extracted in the above-described processing, but since there are no matching items, scene modifier representation selection section 109 generates scene modifier representation 403 "Movement of $(Hanako) stops, draw lines on face" (ST808), and outputs this (ST809).

Next, a case in which scenario 301 is "Hanako was stunned" and scene information is 500*c* will be considered.

In this case, input data acquisition section 103 receives $(Hanako) as agent 302, $(stand) as action 303, scenario 301, and scene information 500*c* (ST801, ST802).

Here, since scenario 301 includes "stunned", characteristic parameter extraction section 104 extracts $(stunned) of the No. 12 entry in word characteristic dictionary 105 as characteristic parameter 203 (ST803). Next, scene modifier representation selection section 109 references scene modifier representation dictionary 106, extracts match conditions 402 matching human-being type data $(Hanako) as agent 302, data $(stand) as action 303, and $(stunned) as characteristic parameter 203 (dictionary ID 401=008), and selects "Movement of agent stops ($(length)), draw lines on face ($(quantity))" and "Movement of agent or active subject other than agent stops ($(length)), draw lines on face ($(quantity))" as scene modifier representations 403 corresponding to match conditions 402 (ST804).

Scene modifier representation selection section 109 references scene modifier representation optimization knowledge 108, and searches for a knowledge ID matching scene information 500*c*, multiple selected scene modifier representations 403, and $(stunned) as characteristic parameter 203. In this case, since there is are two subjects, Taro and Hanako, in scene information 500*c*, the case in which knowledge ID 601 is 002 matches. Also, since the time is $(night) in scene information 500*c*, the case in which knowledge ID 601 is 005 matches. Other knowledge items do not match. Combining these knowledge items, applicable scene modifier representation optimization content is "Give preference to representation relating to active subject other than agent if available", or if this is not possible, "Give preference to representation for agent or agent space", constituting knowledge indicating which of a set of a plurality of scene modifier representations 403 should be selected preferentially, and "Make $(line type) white", constituting knowledge indicating how a value of a variable embedded in scene modifier representation 403 is to be set.

Then, since a plurality of scene modifier representations 403 have been selected (ST805: YES), scene modifier representation selection section 109 selects which of scene modifier representations 403 is to be used using knowledge indicating which of a set of a plurality of scene modifier representations 403 should be selected preferentially ("Give preference to representation relating to active subject other than agent if available", or if this is not possible, "Give preference to representation for agent or agent space"), among applicable scene modifier representation optimization content extracted in the above-described processing. First, scene modifier representation selection section 109 checks whether or not the knowledge "Give preference to representation relating to active subject other than agent if available" can be applied. Two scene modifier representations 403—"Movement of agent stops ($(length)), draw lines on face ($(quantity))" and "Movement of agent or active subject other than agent stops ($(length)), draw lines on face ($(quantity))"—have been selected, and since there is an "active subject other than agent"—in this case, Taro—in the latter, "Movement of agent or active subject other than agent stops ($(length)), draw lines on face ($(quantity))", this selected.

Then, since there are variables in scene modifier representations 403 (ST807: YES), scene modifier representation selection section 109 references knowledge indicating how values of variables embedded in scene modifier representations 403 are to be set, among applicable scene modifier representation optimization content extracted in the above-described processing, but since there are no matching items, scene modifier representation selection section 109 generates scene modifier representation 403 "Movement of $(Hanako) and $(Taro) stops, draw lines on face" (ST808), and outputs this (ST809).

Next, another case in which scenario 301 is "Hanako was stunned" and scene information is 500*c* will be considered.

In this case, input data acquisition section 103 receives $(Hanako) as agent 302, $(eats a meal) as action 303, scenario 301, and scene information 500*c* (ST801, ST802). Here, since scenario 301 includes "stunned", characteristic parameter extraction section 104 extracts $(stunned) of the No. 12 entry in word characteristic dictionary 105 as characteristic parameter 203 (ST803) Next, scene modifier representation selection section 109 references scene modifier representation dictionary 106, extracts match conditions 402 matching human-being type data $(Hanako) as agent 302, data $(eat) as action 303, and $(stunned) as characteristic parameter 203 (dictionary ID 401=007), and selects "Agent drops $(eating utensil) or $(food) held in his/her hand" as scene modifier representation 403 corresponding to match conditions 402 (ST804).

Scene modifier representation selection section 109 references scene modifier representation optimization knowledge 108, and searches for a knowledge ID matching scene information 500*c*, multiple selected scene modifier representations 403, and $(stunned) as characteristic parameter 203. In this case, since there is are two subjects, Taro and Hanako, in scene information 500*c*, the case in which knowledge ID 601 is 002 matches. Also, since the time is $(night) in scene information 500*c*, the case in which knowledge ID 601 is 005 matches. Other knowledge items do not match. Combining these knowledge items, applicable scene modifier representation optimization content is "Give preference to representation relating to active subject other than agent if available", or if this is not possible, "Give preference to representation for agent or agent space", constituting knowledge indicating which of a set of a plurality of scene modifier representations 403 should be selected preferentially, and "Make $(line type) white", constituting knowledge indicating how a value of a variable embedded in scene modifier representation 403 is to be set.

Then, since a plurality of scene modifier representations 403 are not selected (ST805: NO), scene modifier representation selection section 109 checks whether or not there is a variable (ST807). Since there are variables in scene modifier representation 403 (ST807: YES), scene modifier representation selection section 109 references knowledge indicating how values of variables embedded in scene modifier representations 403 are to be set, among applicable scene modifier representation optimization content extracted in the above-described processing, but there are no matching items. Therefore, as it is known from scene information 500*c* that $(fork) can be used as $(eating utensil), scene modifier representation selection section 109 generates scene modifier representation 403 "$(Hanako) drops $(fork)" (ST808), and outputs this (ST809).

In this way, scene modifier representation generation apparatus 102 generates and outputs an optimal scene modifier representation 403 for an input scenario 301, using word characteristic dictionary 105, scene modifier representation dictionary 106, and scene modifier representation optimization knowledge 108.

Figure 10:
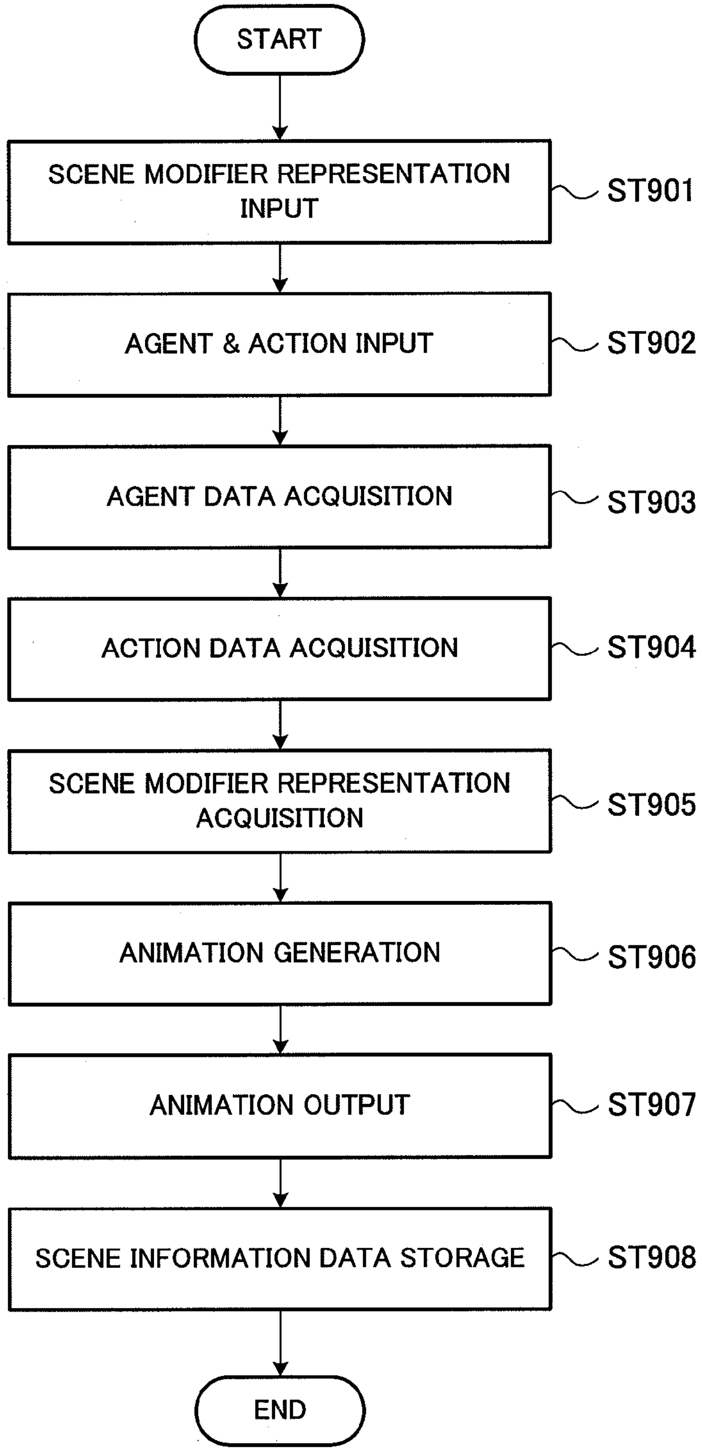
FIG. 10 is a flowchart showing an example of the operation of the animation generation apparatus shown in FIG. 1.

The operation of animation generation apparatus 111 will now be described using FIG. 10. FIG. 10 is a flowchart showing an example of the operation of the animation generation apparatus shown in FIG. 1.

First, a scene modifier representation 403 obtained by scene modifier representation generation apparatus 102 is input (ST901). Next, information relating to agent 302 and action 303 and so forth obtained by animation scenario generation apparatus 101 is input (ST902).

Then agent data for input agent 302 is acquired from agent data storage apparatus 113 (ST903), action data for input action 303 is acquired from action data storage apparatus 114 (ST904), and scene modifier representation data for input scene modifier representation 403 is acquired from scene modifier representation data storage apparatus 115 (ST905).

Next, using the agent data, action data, and scene modifier representation 403 acquired in ST903 through ST905, computer graphics animation is generated (ST906) and output (ST907).

Also, scene information as to what kind of scene has been generated as actual animation is output to, and stored in, scene information storage section 112 (ST908).

In this way, animation generation apparatus 111 generates animation using a scene modifier representation 403.

As described above, according to this embodiment, by extracting a characteristic parameter corresponding to an agent or action included in the surface expression of an input scenario, and performing action scene modifier using this, scene modifier representation can be implemented for a wide range including not only an agent or agent's action, but even an overall scene. By this means, richer expressiveness can be provided without the use of various input commands when computer graphics animation is generated from a scenario. In this way, the expressiveness of content can easily be improved, enabling even a novice content creator lacking representation skills to generate richly expressive computer graphics animation.

Also, according to this embodiment, not only an adverb included in an input scenario, but also a meaning connoted by an active subject or action, can be regarded as a scene modifier constituent and made a component for which a characteristic parameter is extracted. By this means, a user does not have to specify a concrete representation to be implemented by means of computer graphics after generation, but need only plan and textualize the magnitude of an effect to be imparted by that representation, offering the advantage of allowing tasks focusing on textualization to be carried out initially in content creation. Moreover, there is an increase in the types of scene modifier representation for which application is possible, such as the direct use of onomatopoeia included in a surface expression as a scene modifier representation, enabling the expressiveness of computer graphics to be still further improved.

Furthermore, according to this embodiment, a scene modifier representation can be selected based on scene information comprising information relating to an immediately preceding scene—that is, a scene for which representation has been completed. By this means, a scene modifier representation can be obtained according to scene information, and expressiveness can be improved by means of appropriate representation, making it possible to prevent computer graphics from imparting a feeling of disjointedness. By this means, also, even if different scene information is provided, another scene modifier representation having the same kind of effect can be selected, enabling the degree of freedom of content creation to be improved.

Embodiment 2

Embodiment 2 is a case in which a scene modifier representation is selected and optimized using information relating to a property of an agent.

Figure 11:
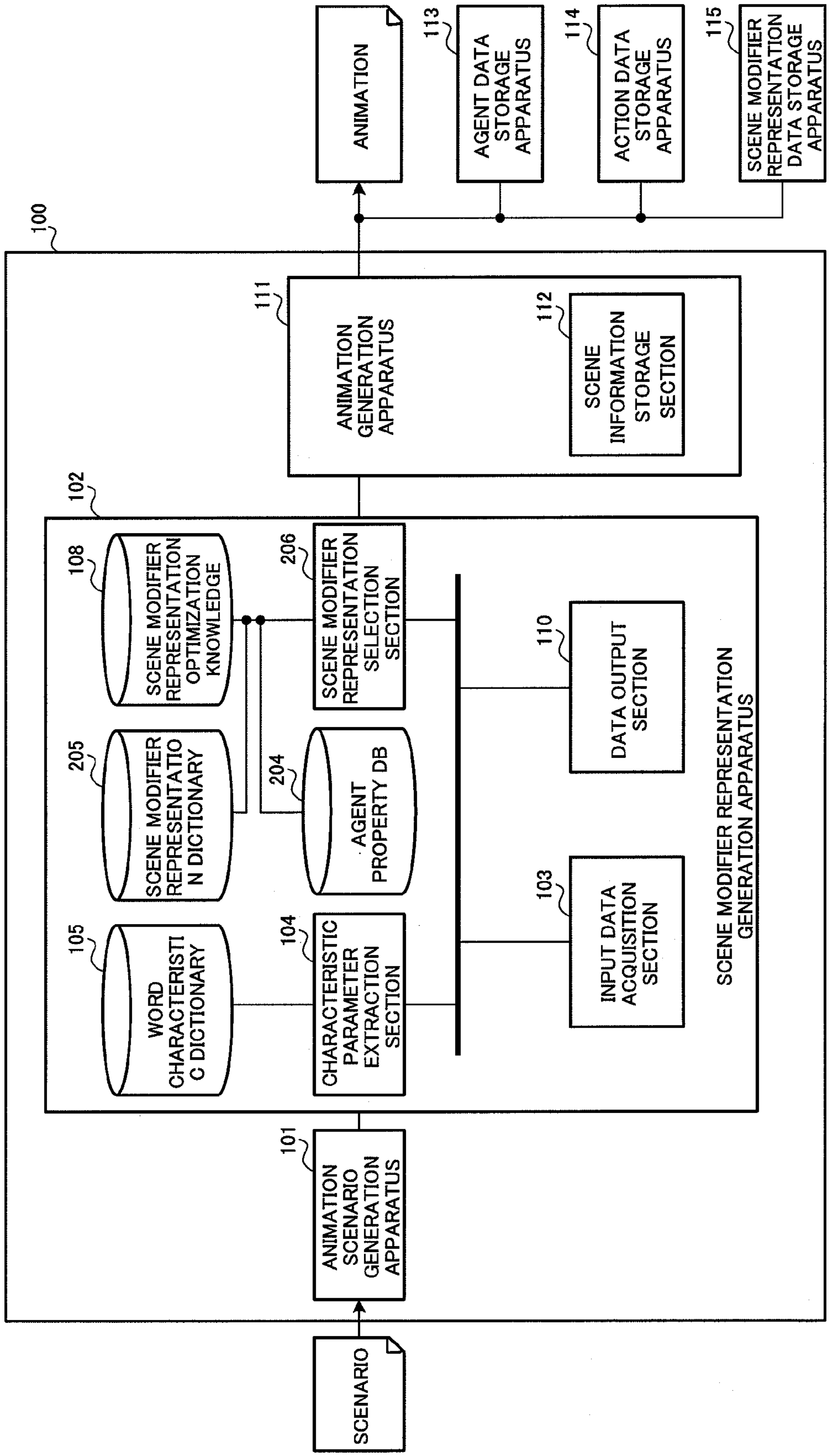
FIG. 11 is a drawing showing an example of the configuration of a computer graphics animation creation system that includes a scene modifier representation generation apparatus according to Embodiment 2 of the present invention.

FIG. 11 is a drawing showing an example of the configuration of a computer graphics animation creation system that includes a scene modifier representation generation apparatus according to Embodiment 2 of the present invention. Configuration elements identical to those of the computer graphics animation creation system of Embodiment 1 shown in FIG. 1 are assigned the same codes as in FIG. 1, and descriptions thereof are omitted.

In FIG. 11, a computer graphics animation creation system 200 has a scene modifier representation generation apparatus 201 instead of scene modifier representation generation apparatus 102 in FIG. 1. Compared with the configuration of scene modifier representation generation apparatus 102 in FIG. 1, scene modifier representation generation apparatus 201 in FIG. 11 additionally has an agent property database (abbreviated to "agent property DB" in FIG. 11) 204, has a scene modifier representation dictionary 205 instead of scene modifier representation dictionary 106, and has a scene modifier representation selection section 206 instead of scene modifier representation selection section 109.

Agent property database 204 stores agents and information relating to agents' properties (for example, character, physique, athleticism, etc.) in associated form. If an agent appearing in a scenario 301 is stored in agent property database 204, scene modifier representation selection and scene modifier representation optimization can be performed by changing characteristic parameter 203, or, when there is a variable in a scene modifier representation, by changing the intensity of the value of that variable, using an agent's property corresponding to (associated with) that agent.

The relationship between agents and agents' properties stored in agent property database 204 will be described using FIG. 12. FIG. 12 is a drawing showing an example of agents 302 and their properties 304 stored in the agent property database shown in FIG. 11.

In FIG. 12, the fact that $(calm) as property 304 is associated with $(Hanako) as agent 302 indicates that Hanako is calm. Also, the fact that $(crybaby) as property 304 is associated with $(Taro) as agent 302 indicates that Taro is a crybaby. Similarly, the fact that $(jovial) as property 304 is associated with $(Ichiro) as agent 302 indicates that Ichiro is jovial, and the fact that $(speedy) as property 304 is associated with $(Jiro) as agent 302 indicates that Jiro is speedy (quick on his feet).

Next, scene modifier representation dictionary 205 will be described using FIG. 13. FIG. 13 is a drawing showing an example of a scene modifier representation dictionary according to this embodiment.

In addition to the information stored by scene modifier representation dictionary 106 in FIG. 1, scene modifier representation dictionary 205 stores sets comprising a dictionary ID 1301 that is an identification number, dictionary item match conditions 1302, and a scene modifier representation 1303 obtained when those conditions 1302 are matched.

Match conditions 1302 comprise a characteristic parameter 203 extracted by characteristic parameter extraction section 104, an agent 302, and a property 304 and action 303 thereof. In this example, it is assumed that agent 302 and property 304 are associated and stored in agent property database 204. Here, if agent 302 is not stored in agent property database 204, match conditions 1302 comprise characteristic parameter 203, agent 302, and action 303, and are the same as match conditions 402 in FIG. 4, and scene modifier representation generation processing is the same as scene modifier representation generation processing in Embodiment 1.

Agent 302 indicates whether agent 302 is a human being, an animal, an inanimate object, etc. Agent 302 property 304 is information relating to a property of agent 302, such as character, physique, athleticism, and so forth. Action 303 may indicate a concrete action such as running, crying, etc., or may indicate a meta-type of some kind of action or some kind of state, such as joy or sadness—that is, a generic action other than a concrete action. With regard to characteristic parameter content, in match conditions 1302 of scene modifier representation dictionary 106, if it is not necessary to divide the dictionary on a characteristic parameter magnitude basis, a plurality of characteristic parameter magnitudes can be written as a condition linked by the symbol "|" as in the case of dictionary ID 001, dictionary ID 002, and dictionary ID 004. The symbol "|" in the figure indicates an "or" condition.

By using this kind of scene modifier representation dictionary 205, when, for example, match conditions 1302 indicate "agent@$$(human being) & agent has_a_property $(calm), action@$(cry), characteristic parameter=$(exaggeration), $(exaggeration+), or $(exaggeration++)", that is, "a calm human being cries exaggeratedly", scene modifier representation 1303 is understood to be "Make tears (20% reduction in $(quantity)) run down agent's face".

Also, when match conditions 1302 indicate "agent@$$ (human being) & agent has_a_property $(crybaby), action@$(cry), characteristic parameter=$(exaggeration), $(exaggeration+), or $(exaggeration++)"—that is, "a crybaby human being cries exaggeratedly"—scene modifier representation 1303 is understood to be "Make tears (20% increase in $(quantity)) run down agent's face".

Also, when match conditions 1302 indicate "agent@$$ (human being) & agent has_a_property $(jovial), action@$ (laugh), characteristic parameter=$(cheerful)"—that is, "a jovial human being laughs cheerfully"—scene modifier representation 1303 is understood to be "Display text 'Hahaha' ($(font), $(size)) above agent space".

Also, when match conditions 1302 indicate "agent@$$ (human being) & a gent has_a_property $(speedy), action@$ (nm), characteristic parameter=$(smoke)"—that is, "a speedy human being runs producing smoke"-scene modifier representation 1303 is understood to be "Smoke rises from soles of agent's feet".

By using scene modifier representation dictionary 205 configured in this way, a scene modifier representation 403 can be determined from match conditions 402 after taking account of a property of an agent appearing in a scenario.

In addition to having the function of scene modifier representation selection section 109 in FIG. 1, scene modifier representation selection section 206 has a function of referencing scene modifier representation dictionary 205, and selecting match conditions 1302 corresponding to information comprising a characteristic parameter, an agent, and a property and action thereof. Also, scene modifier representation selection section 206 optimizes and outputs scene modifier representation 1303 corresponding to selected match conditions 1302, scene modifier representation optimization knowledge 108, scene information 500, and characteristic parameter 203.

Next, the operation of scene modifier representation generation apparatus 201 will be described. A special characteristic of the operation of scene modifier representation generation apparatus 201 lies in ST804 of the flowchart in FIG. 8 showing the operation of scene modifier representation generation apparatus 102, and the operation of other parts is the same as for scene modifier representation generation apparatus 102. Therefore, only ST804 is described here, and a description of the other parts is omitted.

In ST804, scene modifier representation selection section 206 receives characteristic parameter 203 extracted by characteristic parameter extraction section 104, and agent 302 and property 304 thereof, references scene modifier representation dictionary 205, and selects match conditions 1302 corresponding to input characteristic parameter 203, agent 302, and property 304 and action 303 thereof. Then scene modifier representation selection section 206 selects scene modifier representation 1303 corresponding to selected match conditions 1302, scene modifier representation optimization knowledge 108, scene information 500, and characteristic parameter 203.

Also, scene modifier representation selection section 206 references scene modifier representation optimization knowledge 108, extracts all knowledge application conditions 602 matching scene information of the immediately preceding scene obtained in ST802, the plurality of selected scene modifier representations, and the characteristic parameter extracted in ST803, references all the scene modifier representation optimization content 603 corresponding to extracted knowledge application conditions 602, and assembles a collection of applicable scene modifier representation optimization content.

Concrete examples of the processing whereby scene modifier representation generation apparatus 201 generates a scene modifier representation will now be described using FIG. 14. FIG. 14 is a drawing showing an example of scene modifier representations finally obtained when scene information is applied to text scenarios according to this embodiment.

A case in which scenario 301 is "Taro cried all out" and scene information is 500*a* will be considered, for example.

In this case, input data acquisition section 103 receives $(Taro) as agent 302, $(cry) as action 303, scenario 301, and scene information 500*a* (ST801, ST802). Here, $(cry), the action in scenario 301, is an emotive action, and therefore accords with word 202 "all out @$$(emotive action)" of the No. 4 entry in word characteristic dictionary 105, and characteristic parameter extraction section 104 extracts $(exaggeration++) as characteristic parameter 203 (ST803). Next, scene modifier representation selection section 206 references scene modifier representation dictionary 205, extracts match conditions 1302 matching human-being type data $(Taro) as agent 302, data $(crybaby) as property 304 of agent 302 $(Taro), data $(cry) as action 303, and $(exaggeration++) as characteristic parameter 203 (dictionary ID=002), and selects "Make tears (20% increase in $(quantity)) run down agent's face" as scene modifier representation 1303 corresponding to match conditions 1302 (ST804).

Scene modifier representation selection section 206 references scene modifier representation optimization knowledge 108, and searches for a knowledge ID matching scene information 500*a*, selected scene modifier representation 403, and $(exaggeration++) as characteristic parameter 203. In this case, since there are two subjects, Taro and Hanako, in scene information 500*a*, the case in which knowledge ID 601 is 002 matches. Also, since the time is $(night) in scene information 500*a*, the case in which knowledge ID 601 is 005 matches. Furthermore, since the symbol "++" is included in $(exaggeration++) as characteristic parameter 203, the case in which knowledge ID 601 is 007 matches. Other knowledge items do not match. Combining these knowledge items, applicable scene modifier representation optimization content is "Give preference to representation relating to active subject other than agent if available", or if this is not possible, "Give preference to representation for agent or agent space", as well as "Make multiple selections when there are multiple applicable scene modifier representations 403" given preference exceptionally, constituting knowledge indicating which of a set of a plurality of scene modifier representations 403 should be selected preferentially, and "Make $(line type) white" and "Make 60% increase in values of $(quantity), $(size), and $(length) of item represented", constituting knowledge indicating how values of variables embedded in scene modifier representation 403 are to be set.

Since a plurality of scene modifier representations 403 are not selected (ST805: NO), scene modifier representation selection section 206 checks whether or not there is a variable in scene modifier representation 403 selected in ST804, and since there are variables in scene modifier representation 403 (ST807: YES), scene modifier representation selection section 206 uses knowledge indicating how values of variables embedded in scene modifier representation 1303 are to be set ("Make $(line type) white" and "Make 60% increase in values of $(quantity), $(size), and $(length) of item represented"), among applicable scene modifier representation optimization content extracted in the above-described processing, to determine that, within scene modifier representation 403 "Make tears ($(quantity)) run down agent's face", $(quantity) is to be increased by 60%. Then, by combining this scene modifier representation 403 with scene modifier representation 1303 "Make tears (20% increase in $(quantity)) run down agent's face" determined by property 304 of agent 302, scene modifier representation 1303 "Emit $(Hanako)'s tears increased by 92%" is generated (ST808) and output (ST809).

Next, a case in which scenario 301 is "Hanako ran extremely hurriedly" and scene information is 500*a* will be considered.

In this case, input data acquisition section 103 receives $(Hanako) as agent 302, $(nm) as action 303, scenario 301, and scene information 500*a* (ST801, ST802). Here, "extremely hurriedly" in scenario 301 accords with word 202 of the No. 1 and No. 2 entries in word characteristic dictionary 105, and therefore characteristic parameter extraction section 104 extracts $(hurry+) as characteristic parameter 203 (ST803). Next, scene modifier representation selection section 206 references scene modifier representation dictionary 205, extracts match conditions 402 matching human-being type data $(Hanako) as agent 302, data $(nm) as action 303, and $(hurry) as characteristic parameter 203 (dictionary ID 401=001), and selects the three items "Draw running lines ($(line type)) in overall scene", "Draw lines ($(quantity), $(line type)) behind agent space", and "Agent's face has gritted teeth" as scene modifier representations 403 corresponding to match conditions 402. At the same time, scene modifier representation selection section 206 extracts match conditions 1302 matching human-being type data $(Hanako) as agent 302, data $(speedy) as property 304 of agent 302 $(Hanako), data $(nm) as action 303, and $(smoke) as characteristic parameter 203 (dictionary ID 1301=004), and selects "Smoke rises from soles of agent's feet" as scene modifier representation 1303 corresponding to match conditions 1302 (ST804).

Scene modifier representation selection section 206 references scene modifier representation optimization knowledge 108, and searches for a knowledge ID matching scene information 500*a*, multiple selected scene modifier representations 403, and $(hurry+) as characteristic parameter 203. In this case, since there are two subjects, Taro and Hanako, in the scene information, the case in which knowledge ID 601 is 002 matches. Also, since the time is $(night) in scene information 500*a*, the case in which knowledge ID 601 is 005 matches. Furthermore, since a "+" symbol is included in $(hurry+) as characteristic parameter 203, the case in which knowledge ID 601 is 006 matches. Other knowledge items do not match. Combining these knowledge items, applicable scene modifier representation optimization content is "Give preference to representation relating to active subject other than agent if available", or if this is not possible, "Give preference to representation for agent or agent space", constituting knowledge indicating which of a set of a plurality of scene modifier representations 403 should be selected preferentially, and "Make $(line type) white" and "Make 30% increase in values of $(quantity), $(size), and $(length) of item represented", constituting knowledge indicating how values of variables embedded in scene modifier representation 403 are to be set.

Next, since a plurality of scene modifier representations 403 have been selected (ST805: YES), scene modifier representation selection section 206 selects one of scene modifier representations 403 using knowledge indicating which of a set of a plurality of scene modifier representations 403 should be selected preferentially ("Give preference to representation relating to active subject other than agent if available", or if this is not possible, "Give preference to representation for agent or agent space"), among applicable scene modifier representation optimization content extracted in the above-described processing. First, scene modifier representation selection section 206 checks whether or not the knowledge "Give preference to representation relating to active subject other than agent if available" can be applied. Three scene modifier representations 403—"Draw running lines ($(line type) in overall scene", "Draw lines ($(quantity), $(line type)) behind agent space", and "Agent's face has gritted teeth"—have been selected, among which there is no representation relating to an active subject other than the agent—in this case, Taro—and therefore application is not possible. Next, scene modifier representation selection section 206 determines whether or not the knowledge "Give preference to representation for agent or agent space" can be applied. There is a "representation for agent space", namely "Draw lines ($(quantity), $(line type)) behind agent space". Therefore, "Give preference to representation for agent or agent space" is applied and "Draw lines ($(quantity) $(line type)) behind agent space" is selected as scene modifier representation 403 (ST806).

Then, since there are variables in scene modifier representation 403 (ST807: YES), scene modifier representation selection section 206 uses knowledge indicating how values of variables embedded in scene modifier representation 403 are to be set ("Make $(line type) white" and "Make 30% increase in values of $(quantity), $(size), and $(length) of item represented"), among applicable scene modifier representation optimization content extracted in the above-described processing, to determine that, within scene modifier representation 403 "Draw lines ($(quantity), $(line type)) behind agent space", the content of $(line type) is to be white and $(quantity) is to be increased by 30%. As a result, scene modifier representation 403 "Draw running lines (white) increased by 30% in $(Hanako)'s agent space" is generated (ST808), and output together with scene modifier representation 1303 "Smoke rises from soles of agent's feet" (ST809).

In this way, scene modifier representation generation apparatus 201 generates and outputs optimal scene modifier representations 403 and 1303 for an input scenario 301 using word characteristic dictionary 105, scene modifier representation optimization knowledge 108, agent property database 204, scene modifier representation dictionary 205, and scene modifier representation selection section 206.

In this embodiment, it has been assumed that an agent property database 204 is provided in which agents and agents' property related information are stored in associated form, but this is not a limitation. For example, an agent and agent's property may be provided as scenario (input text) input information, and a scene modifier representation that reflects the agent's property may be implemented. In this case, various modes are possible for a scene modifier representation that uses information indicating an agent's property.

For example, an agent and agent's property can be combined as a combination of words included in word characteristic dictionary 105. For instance, if a word 202 indicating an agent "Taro" is followed by a word denoting a locomotive action, characteristic parameter 203 $(hurry++) indicating hurrying extremely is associated therewith. In this case, a property "impatient" of agent Taro can be reflected in a scene modifier representation.

Also, an agent's property can be used as a knowledge application condition 602 of scene modifier representation optimization knowledge 108. For example, if knowledge application condition 602 is "Agent $(scene) component subject is crybaby", scene modifier representation optimization content 603 becomes "If 'cry' is in agent's action, make 30% increase in tears $(quantity) shed by that agent"—that is, "If 'cry' is in an agent's action in a scene modifier representation, and a $(quantity) variable is included, increase its value by 30%". In this way, an agent's "crybaby" property can be reflected in a scene modifier representation.

In this embodiment, it has been assumed that a scene modifier representation selected/optimized by means of information relating to an agent's property is always reflected, but the present invention is not limited to this. For example, determination as to whether or not information relating to an agent's property is to be reflected may be incorporated into knowledge application condition 602 of scene modifier representation optimization knowledge 108.

In this embodiment, it has been assumed that an agent's property stored in agent property database 204 is input to scene modifier representation selection section 206, but this embodiment is not limited to this. For example, agent property database 204 may be located outside scene modifier representation generation apparatus 201, and even outside computer graphics animation creation system 200, and an agent property stored in agent property database 204 may be input to animation scenario generation apparatus 101.

Thus, in this embodiment, agents and information relating to agents' properties are stored beforehand in associated form, and when a stored agent appears in a scenario, scene modifier that reflects the relevant property can be performed, enabling a more appropriate representation to be provided for the composition of the scene in question.

In the above embodiments, a case has been described in which scene modifier representation generation apparatus 102 or 201 uses scene information, but this is not a limitation, and modifier of an action scene may be performed using only agent and action information obtained from a scenario together with a text scenario input by the user.

Also, a method is possible whereby, if there is no scene modifier representation matched by conditions, a scene modifier representation can be obtained by relaxing the match conditions. For example, if "Hanako" in "Hanako cried 'boo-hoo'" is "an elephant", although dictionary ID 002 in FIG. 4 does not strictly match, modifier may be performed so that a representation of an elephant is anthropomorphized and copious tears flow from the elephant's eyes in order to implement an amusing representation.

In the above embodiments, a characteristic parameter is indicated by a discrete keyword as shown in FIG. 2, but a method is also possible whereby a characteristic parameter is a combination of a plurality of keywords, or is represented by a normalized vector.

In the above embodiments, expressions with the emphasis placed on readability have been used in describing agents and actions, characteristic parameters, scene modifier representations, scene modifier representation optimization knowledge, scene information, and so forth, but internal expressions/representations at the time of implementation are not limited by these expressions.

In the above embodiments, characteristic parameter extraction section 104 is provided inside scene modifier representation generation apparatus 102 or 201, but a configuration is also possible in which the function of extracting characteristic parameters is located outside scene modifier representation generation apparatus 102 or 201.

In the above embodiments, scene modifier representation optimization knowledge 108 is used by scene modifier representation selection section 109 or 206, but if a configuration is used in which a plurality of scene modifier representations are not associated with each entry in scene modifier representation dictionary 106 or 205, and variables are not included, it is also possible to select a scene modifier representation without providing scene modifier representation optimization knowledge 108.

In the above embodiments, word characteristic dictionary 105, scene modifier representation dictionary 106 or 205, and scene modifier representation optimization knowledge 108 are provided inside scene modifier representation generation apparatus 102 or 201, but a configuration is also possible in which these are located outside, and are downloaded from a network as necessary.

In the above embodiments, describing word characteristic dictionary 105, scene modifier representation dictionary 106 or 205, and scene modifier representation optimization knowledge 108 declaratively beforehand offers the advantages of making dictionary and knowledge expansion and amendment easy, and allowing easy configuration modification by incorporating scene modifier representations used by others.

In the above embodiments, scene information has been described as being obtained by input data acquisition section 103 of scene modifier representation generation apparatus 102 or 201 as animation generation apparatus 111 output, but if scene information can be established separately, that may also be used. For example, a case is also possible in which, if text such as the stage directions of a theatrical scenario is written beforehand in the input scenario, scene information is generated by animation scenario generation apparatus 101, and this is used until the scene changes.

In the above embodiments, examples of scene modifier representation generation in a computer graphics animation creation system have been described, but the present invention is not limited to animation, and by adapting the scene modifier representation dictionary to still-image use, the same method can also be used to generate scene modifier representations when generating still images with computer graphics.

In the above embodiments, a case has been described in which scene modifier representation generation apparatus 102 or 201 is configured as hardware, but a mode may also be used whereby processing performed by scene modifier representation generation apparatus 102 or 201 is made a program, and is executed by a general-purpose computer.

A scene modifier representation generation apparatus of the present invention employs a configuration that includes: a scene modifier representation dictionary that stores a scene modifier representation that is a modifier representation relating to a computer graphics scene together with an application condition; a scene modifier representation selection section that selects a scene modifier representation corresponding to an application condition that matches agent and action information and a characteristic parameter indicating a characteristic of a provided scenario that are obtained from the scenario using the scene modifier representation dictionary; and a data output section that outputs the selected scene modifier representation.

By this means, it is possible to select a scene modifier representation for a wide range including not only an agent's action, but even an overall scene, from actions and agents included in a scenario and characteristics held by the scenario. As a result, the expressiveness of computer graphics can easily be improved.

Preferably, an above-described scene modifier representation generation apparatus further has scene modifier representation optimization knowledge including knowledge for selecting a scene modifier representation that should be used for scene information that is an element composing the computer graphics scene; and the scene modifier representation selection section, when a plurality of scene modifier representations are selected, selects an optimal scene modifier representation for the scene information from the plurality of scene modifier representations using the scene information and the scene modifier representation optimization knowledge.

By this means, a scene modifier representation can be optimized based on scene information. As a result, computer graphics can be prevented from imparting a feeling of disjointedness, and a more appropriate representation can be provided for the composition of the scene in question.

Preferably, also, in an above-described scene modifier representation generation apparatus, the scene modifier representation includes a variable whose value is determined according to scene information that is an element composing the computer graphics scene, and there is further provided scene modifier representation optimization knowledge that includes knowledge for determining a value of the variable included in the scene modifier representation according to the scene information; and the scene modifier representation selection section, when a variable is included in the selected scene modifier representation, generates a scene modifier representation to be output by determining a value of the variable included in the selected scene modifier representation using the scene information and the scene modifier representation optimization knowledge.

By this means, it is possible for a variable included in a scene modifier representation to be optimized based on scene information. As a result, a more appropriate representation can be provided for the composition of the scene in question.

Preferably, also, in an above-described scene modifier representation generation apparatus, the scene modifier representation includes a variable whose value is determined according to the characteristic parameter, and there is further provided scene modifier representation optimization knowledge that includes knowledge for determining a value of the variable included in the scene modifier representation according to the characteristic parameter; and the scene modifier representation selection section, when a variable is included in the selected scene modifier representation, generates a scene modifier representation to be output by determining a value of the variable included in the selected scene modifier representation using the characteristic parameter and the scene modifier representation optimization knowledge.

By this means, it is possible for a variable included in a scene modifier representation to be optimized based on a value indicating a degree of emphasis included in a characteristic parameter. As a result, a representation more appropriate for a characteristic parameter can be provided.

Preferably, also, in an above-described scene modifier representation generation apparatus, the scene information includes at least one of an agent, location, object, and time composing the computer graphics scene.

By this means, a scene modifier representation appropriate to an agent, location, object, and time can be generated.

Preferably also, an above-described scene modifier representation generation apparatus employs a configuration that further includes: a word characteristic dictionary that stores a pair comprising a word or combination of words and a characteristic parameter corresponding to the word or combination of words; and a characteristic parameter extraction section that extracts a characteristic parameter corresponding to a word or combination of words included in the scenario, using the word characteristic dictionary.

By this means, a characteristic parameter extraction section can easily extract a characteristic parameter corresponding to a word or combination of words by using a word characteristic dictionary. Also, since characteristic parameters corresponding to a meaning connoted by a word or combination of words are also provided in associated form in the word characteristic dictionary, the characteristic parameter extraction section can extract a characteristic parameter corresponding to a meaning connoted by a scenario.

Preferably, also, in an above-described scene modifier representation generation apparatus, the scene modifier representation selection section, when a word whose font form differs from that of other words is included in the scenario, selects a scene modifier representation that emphasizes the meaning of the word.

By this means, changing the font form of text included in a scenario enables a characteristic parameter corresponding to text whose font form has been changed to be emphasized.

Preferably, also, in an above-described scene modifier representation generation apparatus, the scene modifier representation selection section, when onomatopoeia is included in the scenario, selects a scene modifier representation that displays the onomatopoeia.

By this means, when onomatopoeia is input, it is possible to generate a scene modifier representation that indicates the input onomatopoeia appropriately and strongly by displaying that onomatopoeia.

Preferably, also, in an above-described scene modifier representation generation apparatus, the scene modifier representation includes a representation that distorts the body of an agent.

By this means, the scope of variations of scene modifier representations relating to an agent can be extended by distorting the body of an agent.

Preferably, also, in an above-described scene modifier representation generation apparatus, the scene modifier representation includes a representation relating to belongings and/or clothing of an agent.

By this means, the scope of variations of scene modifier representations relating to an agent can be extended by changing a representation relating to belongings and/or clothing of an agent.

Preferably, also, in an above-described scene modifier representation generation apparatus, the scene modifier representation includes a representation relating to an action of an agent.

By this means, the scope of variations of scene modifier representations relating to an agent can be extended by changing an action of an agent.

Preferably, also, in an above-described scene modifier representation generation apparatus, the scene modifier representation includes a representation relating to the background of an agent.

By this means, an overall scene modifier representation including an agent can be implemented by changing a representation relating to the background of an agent, without changing a representation relating to the actual agent.

Preferably, also, in an above-described scene modifier representation generation apparatus, the scene modifier representation includes a representation relating to an overall scene.

By this means, a comprehensive scene modifier representation can be implemented by providing a scene modifier representation relating to an overall scene.

Preferably, also, in an above-described scene modifier representation generation apparatus, when a scene is composed by means of 3-dimensional graphics, a representation relating to the projection method of the 3-dimensional graphics is included.

By this means, scene modifier representations can be implemented with more variations by providing scene modifier representations with varied 3-dimensional graphics projection methods.

A computer graphics creation system of the present invention employs a configuration that includes: a scenario generation apparatus that extracts agent and action information from a provided scenario and outputs the extracted agent and action information together with the scenario; an above-described scene modifier representation generation apparatus that receives the agent and action information and the scenario from the scenario generation apparatus, and outputs a scene modifier representation that is a modifier representation relating to a computer graphics scene; and a graphics generation apparatus that generates computer graphics using the scene modifier representation output from the scene modifier representation generation apparatus.

By this means, it is possible to select a scene modifier representation for a wide range including not only an agent's action, but even an overall scene, from actions and agents included in a scenario and characteristics held by a scenario, and generate computer graphics using the generated scene modifier representation.

The present application is based on Japanese Patent Application No. 2004-347840 filed on Nov. 30, 2004, entire content of which is expressly incorporated herein by reference.

INDUSTRIAL APPLICABILITY

A scene modifier representation generation apparatus and scene modifier representation generation method according to the present invention enable a scene modifier representation suitable for a scene to be generated automatically from a scene modifier component included in a provided scenario (for example, input text). That is to say, a scene modifier representation generation apparatus and scene modifier representation generation method have an effect of enabling the expressiveness of animation to be significantly improved without difficulty when a modifier representation relating to a scene used in computer graphics is generated automatically from input text, and are particularly useful for the creation of animation by means of a mobile phone, PDA, PC (Personal Computer), or the like, for novices.

The invention claimed is:

1. A scene modifier representation generation apparatus comprising:

a scene modifier representation dictionary that stores a scene modifier representation and an application condition, the scene modifier representation being a modifier representation relating to a computer graphics scene and being associated with the application condition, the scene modifier representation dictionary further including, as the application condition, agent and action information, and a characteristic parameter indicating a characteristic of a provided scenario;

a scene modifier representation selector that selects a scene modifier representation corresponding to an application condition that matches the agent and action information and a characteristic parameter indicating a characteristic of the provided scenario that are obtained from the provided scenario, using the scene modifier representation dictionary; and a data outputter that outputs the selected scene modifier representation.

2. The scene modifier representation generation apparatus according to claim 1, further comprising scene modifier representation optimization knowledge including knowledge for selecting a scene modifier representation that should be used for scene information that is an element composing the computer graphics scene, wherein the scene modifier representation selector, when a plurality of scene modifier representations are selected, selects an optimal scene modifier representation for the scene information from the plurality of scene modifier representations using the scene information and the scene modifier representation optimization knowledge.

3. The scene modifier representation generation apparatus according to claim 1, wherein:

the scene modifier representation includes a variable whose value is determined according to scene information that is an element composing the computer graphics scene;

there is further provided scene modifier representation optimization knowledge that includes knowledge for determining a value of the variable included in the scene modifier representation according to the scene information; and the scene modifier representation selector, when a variable is included in the selected scene modifier representation, generates a scene modifier representation to be output by determining a value of the variable included in the selected scene modifier representation using the scene information and the scene modifier representation optimization knowledge.

4. The scene modifier representation generation apparatus according to claim 1, wherein:

the scene modifier representation includes a variable whose value is determined according to the characteristic parameter;

there is further provided scene modifier representation optimization knowledge that includes knowledge for determining a value of the variable included in the scene modifier representation according to the characteristic parameter; and the scene modifier representation selector, when a variable is included in the selected scene modifier representation, generates a scene modifier representation to be output by determining a value of the variable included in the selected scene modifier representation using the characteristic parameter and the scene modifier representation optimization knowledge.

5. The scene modifier representation generation apparatus according to claim 1, wherein:

the scene modifier representation dictionary includes an application condition relating to a property of an agent; and the scene modifier representation selector selects a scene modifier representation corresponding to an application condition that matches the agent, an agent property, the action information, and the characteristic parameter indicating the characteristic of the provided scenario that are obtained from the provided scenario, using the scene modifier representation dictionary.

6. The scene modifier representation generation apparatus according to claim 2, wherein the scene information includes at least one of the agent, location, object, and time composing the computer graphics scene.

7. The scene modifier representation generation apparatus according to claim 3, wherein the scene information includes at least one of the agent, location, object, and time composing the computer graphics scene.

8. The scene modifier representation generation apparatus according to claim 1, further comprising:

a word characteristic dictionary that stores a pair composed of a word or combination of words and a characteristic parameter corresponding to the word or combination of words; and a characteristic parameter extractor that extracts a characteristic parameter corresponding to a word or combination of words included in the provided scenario, using the word characteristic dictionary.

9. The scene modifier representation generation apparatus according to claim 1, wherein the scene modifier representation selector, when a word whose font form differs from that of other words is included in the scenario, selects a scene modifier representation that emphasizes a meaning of the word.

10. The scene modifier representation generation apparatus according to claim 1, wherein the scene modifier representation selector, when onomatopoeia is included in the scenario, selects a scene modifier representation that displays the onomatopoeia.

11. The scene modifier representation generation apparatus according to claim 1, wherein the scene modifier representation includes a representation that distorts a body of an agent.

12. The scene modifier representation generation apparatus according to claim 1, wherein the scene modifier representation includes a representation relating to belongings and/or clothing of the agent.

13. The scene modifier representation generation apparatus according to claim 1, wherein the scene modifier representation includes a representation relating to an action of the agent.

14. The scene modifier representation generation apparatus according to claim 1, wherein the scene modifier representation includes a representation relating to a background of the agent.

15. The scene modifier representation generation apparatus according to claim 1, wherein the scene modifier representation includes a representation relating to an overall scene.

16. The scene modifier representation generation apparatus according to claim 1, wherein the scene modifier representation, when a scene is composed by means of 3-dimensional graphics, includes a representation relating to a projection method of the 3-dimensional graphics.

17. A computer graphics creation system, comprising:

a scenario generation apparatus that extracts agent and action information from a provided scenario and outputs extracted agent and action information together with the scenario;

the scene modifier representation generation apparatus according to claim 1 that receives the agent and action information and the scenario from the scenario generation apparatus, and outputs a scene modifier representation that is a modifier representation relating to a computer graphics scene; and a graphics generation apparatus that generates computer graphics using the scene modifier representation output from the scene modifier representation generation apparatus.

18. A scene modifier representation generation method, comprising:

executing a set of instructions by a computer that, when executed:

select a scene modifier representation corresponding to an application condition that matches agent and action information and a characteristic parameter indicating a characteristic of a provided scenario that are obtained from the provided scenario, using a scene modifier representation dictionary that stores a scene modifier representation and an application condition, the scene modifier representation being a modifier representation relating to a computer graphics scene and being associated with the application condition, the scene modifier representation dictionary further including, as the application condition, agent and action information, and a characteristic parameter indicating a characteristic of the provided scenario; and output the selected scene modifier representation.

19. A scene modifier representation generation program that, when executed by a computer:

selects a scene modifier representation corresponding to an application condition that matches agent and action information and a characteristic parameter indicating a characteristic of a provided scenario that are obtained from the provided scenario, by searching a scene modifier representation dictionary that stores a scene modifier representation and an application condition, the scene modifier representation being a modifier representation relating to a computer graphics scene and being associated with the application condition, the scene modifier representation dictionary further including, as the application condition, agent and action information, and a characteristic parameter indicating a characteristic of the provided scenario; and outputs to a user the selected scene modifier representation.

* * * * *